US010771332B2

(12) United States Patent
Mahajan et al.

(10) Patent No.: US 10,771,332 B2
(45) Date of Patent: *Sep. 8, 2020

(54) DYNAMIC SCHEDULING OF NETWORK UPDATES

(71) Applicant: Microsoft Technology Licensing, LLC, Redmond, WA (US)

(72) Inventors: Ratul Mahajan, Seattle, WA (US); Ming Zhang, Redmond, WA (US); Srikanth Kandula, Redmond, WA (US); Hongqiang Liu, Redmond, WA (US); Xin Jin, Princeton, NJ (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 198 days.

This patent is subject to a terminal disclaimer.

(21) Appl. No.: 15/855,892

(22) Filed: Dec. 27, 2017

(65) Prior Publication Data

US 2018/0123875 A1    May 3, 2018

Related U.S. Application Data

(63) Continuation of application No. 14/298,794, filed on Jun. 6, 2014, now Pat. No. 9,887,878.

(51) Int. Cl.
*H04L 12/24* (2006.01)
*H04L 29/08* (2006.01)

(52) U.S. Cl.
CPC ........ *H04L 41/082* (2013.01); *H04L 41/0813* (2013.01); *H04L 67/12* (2013.01); *H04L 67/32* (2013.01)

(58) Field of Classification Search
CPC ....... H04L 41/082; H04L 67/32; H04L 67/12; H04L 41/0813
See application file for complete search history.

(56) References Cited

U.S. PATENT DOCUMENTS 5,537,580 A    7/1996  Giomi et al.
5,850,505 A    12/1998 Grover et al.
(Continued)

FOREIGN PATENT DOCUMENTS

| EP | 1946502 A1 | 7/2008 |
| WO | 9834350 A2 | 8/1998 |
| WO | 2013071965 A1 | 5/2013 |

OTHER PUBLICATIONS

"Office Action Issued in Chinese Patent Application No. 201580029987.2", dated Jan. 31, 2019, 13 pages.
(Continued)

*Primary Examiner* — Patrice L Winder
(74) *Attorney, Agent, or Firm* — Newport IP, LLC; Jacob P. Rohwer

(57) ABSTRACT

The techniques and/or systems described herein are configured to determine a set of update operations to transition a network from an observed network state to a target network state and to generate an update dependency graph used to dynamically schedule the set of update operations based on constraint(s) defined to ensure reliability of the network during the transition. The techniques and/or systems dynamically schedule the set of update operations based on feedback. For example, the feedback may include an indication that a previously scheduled update operation has been delayed, has failed, or has been successfully completed.

17 Claims, 10 Drawing Sheets

(56) References Cited

U.S. PATENT DOCUMENTS

| | | |
|---|---|---|
| 6,606,580 B1 | 8/2003 | Zedda et al. |
| 6,724,722 B1 | 4/2004 | Wang et al. |
| 6,748,447 B1 | 6/2004 | Basani et al. |
| 7,221,945 B2 | 5/2007 | Milford et al. |
| 7,251,582 B2 | 7/2007 | Singh et al. |
| 7,385,938 B1* | 6/2008 | Beckett ............... H04L 41/0813 370/254 |
| 7,469,392 B2 | 12/2008 | Mang et al. |
| 7,539,133 B2 | 5/2009 | van Haalen et al. |
| 7,546,333 B2* | 6/2009 | Alon ....................... H04L 29/06 707/999.001 |
| 7,552,205 B2 | 6/2009 | Lamb et al. |
| 7,610,386 B1 | 10/2009 | Martinez et al. |
| 7,680,055 B1 | 3/2010 | Ramakrishnan et al. |
| 7,730,364 B2 | 6/2010 | Chang et al. |
| 7,746,784 B2 | 6/2010 | de Heer |
| 7,761,530 B2* | 7/2010 | Cain ....................... G06Q 10/06 709/213 |
| 7,796,500 B1 | 9/2010 | Elliott et al. |
| 7,797,648 B1 | 9/2010 | Huang |
| 7,831,627 B2 | 11/2010 | Chickering et al. |
| 7,839,789 B2 | 11/2010 | Kakadia et al. |
| 7,865,578 B1* | 1/2011 | Gerraty ............. H04L 12/40013 709/220 |
| 7,894,478 B2 | 2/2011 | Ullmann et al. |
| 7,990,885 B2 | 8/2011 | Rajan |
| 7,996,719 B2 | 8/2011 | Bemabeu-Auban et al. |
| 8,086,701 B2 | 12/2011 | Goel et al. |
| 8,135,990 B2 | 3/2012 | Vankov et al. |
| 8,175,846 B2 | 5/2012 | Khalak et al. |
| 8,228,804 B2 | 7/2012 | Ninan et al. |
| 8,369,222 B2 | 2/2013 | Kakadia et al. |
| 8,432,832 B2* | 4/2013 | Zuk ....................... H04L 41/084 370/254 |
| 8,463,916 B2 | 6/2013 | Rabbie et al. |
| 8,494,539 B1 | 7/2013 | Surazski et al. |
| 8,543,998 B2* | 9/2013 | Barringer ............. G06F 11/3664 717/169 |
| 8,612,583 B2 | 12/2013 | Hui et al. |
| 8,613,002 B2 | 12/2013 | Narayanan et al. |
| 8,644,161 B2 | 2/2014 | Woundy et al. |
| 8,700,958 B2 | 4/2014 | Vankov et al. |
| 8,775,574 B2* | 7/2014 | DeHaan ............... H04L 41/0853 709/220 |
| 8,787,392 B2 | 7/2014 | Vasseur et al. |
| 8,805,976 B2* | 8/2014 | Ozawa .................. H04L 67/125 709/221 |
| 8,819,220 B2 | 8/2014 | Nagura et al. |
| 8,826,032 B1 | 9/2014 | Yahalom et al. |
| 8,831,587 B2* | 9/2014 | Pollakowski ......... H04L 41/082 455/422.1 |
| 8,887,132 B1 | 11/2014 | Hunter |
| 8,897,174 B2* | 11/2014 | Komarevtsev ...... H04L 41/0843 370/252 |
| 9,081,643 B2* | 7/2015 | Wang ....................... G06F 8/65 |
| 9,094,299 B1* | 7/2015 | Rao D.S. ............ H04L 41/0813 |
| 9,100,292 B2* | 8/2015 | Govindarajeswaran ..................... H04L 43/065 |
| 9,110,524 B1 | 8/2015 | Jiang et al. |
| 9,141,625 B1 | 9/2015 | Thornewell et al. |
| 9,183,092 B1 | 11/2015 | Marr et al. |
| 9,231,892 B2* | 1/2016 | Baphna .................. H04L 49/70 |
| 9,350,567 B2* | 5/2016 | Dinger ............... H04L 12/6418 |
| 9,391,959 B2* | 7/2016 | Bjarnason ............. H04L 45/64 |
| 9,647,891 B2* | 5/2017 | Croy ..................... H04L 41/0893 |
| 9,648,020 B2* | 5/2017 | Naik ..................... G06F 21/105 |
| 9,716,625 B2* | 7/2017 | Song ..................... H04L 41/082 |
| 9,755,900 B2* | 9/2017 | Tenginakai ........... H04L 41/082 |
| 9,893,940 B1* | 2/2018 | Chawla .................. G06F 16/84 |
| 10,491,470 B2* | 11/2019 | Aaron ..................... H04L 67/42 |
| 2002/0019864 A1* | 2/2002 | Mayer ................. G06F 9/44505 709/223 |
| 2002/0130872 A1 | 9/2002 | Novikova et al. |
| 2003/0014644 A1 | 1/2003 | Burns et al. |
| 2003/0055668 A1 | 3/2003 | Saran et al. |
| 2003/0106062 A1 | 6/2003 | Shteyn et al. |
| 2003/0220906 A1 | 11/2003 | Chickering |
| 2004/0218535 A1 | 11/2004 | Liong et al. |
| 2005/0076339 A1 | 4/2005 | Merril et al. |
| 2005/0188242 A1 | 8/2005 | Rabbat et al. |
| 2006/0103869 A1 | 5/2006 | Kato |
| 2007/0073737 A1 | 3/2007 | Patterson |
| 2007/0282914 A1 | 12/2007 | Sivapragasam et al. |
| 2008/0215713 A1 | 9/2008 | Cannon et al. |
| 2008/0262992 A1 | 10/2008 | Meijer et al. |
| 2008/0271022 A1 | 10/2008 | Strassner et al. |
| 2008/0300851 A1 | 12/2008 | Chakrabarti et al. |
| 2009/0161878 A1 | 6/2009 | Nam et al. |
| 2009/0172689 A1 | 7/2009 | Bobak et al. |
| 2009/0240645 A1 | 9/2009 | Cowham |
| 2009/0327199 A1 | 12/2009 | Weber et al. |
| 2010/0250744 A1 | 9/2010 | Hadad et al. |
| 2011/0116389 A1 | 5/2011 | Tao et al. |
| 2011/0154132 A1 | 6/2011 | Aybay |
| 2011/0185359 A1 | 7/2011 | Chakrabarti |
| 2011/0191109 A1 | 8/2011 | Harma |
| 2011/0231573 A1 | 9/2011 | Vasseur et al. |
| 2012/0101980 A1 | 4/2012 | Taleghani et al. |
| 2012/0102543 A1* | 4/2012 | Kohli ..................... H04L 63/20 726/1 |
| 2012/0163178 A1 | 6/2012 | Gordon et al. |
| 2012/0166660 A1 | 6/2012 | Zhang et al. |
| 2012/0167168 A1 | 6/2012 | Orr et al. |
| 2012/0209582 A1 | 8/2012 | Purushothaman |
| 2012/0216201 A1 | 8/2012 | Aghajanyan et al. |
| 2012/0221678 A1 | 8/2012 | Tanaka |
| 2012/0311111 A1* | 12/2012 | Frew ..................... G06F 9/5072 709/221 |
| 2012/0323702 A1 | 12/2012 | Puentes et al. |
| 2012/0324472 A1 | 12/2012 | Rossbach et al. |
| 2013/0031253 A1 | 1/2013 | Hui et al. |
| 2013/0060929 A1 | 3/2013 | Koponen et al. |
| 2013/0114466 A1 | 5/2013 | Koponen et al. |
| 2013/0121331 A1 | 5/2013 | Vasseur et al. |
| 2013/0250805 A1 | 9/2013 | Hansmann |
| 2013/0294250 A1 | 11/2013 | Berelejis et al. |
| 2013/0329632 A1 | 12/2013 | Buyukkoc et al. |
| 2014/0020043 A1 | 1/2014 | Anand et al. |
| 2014/0126395 A1 | 5/2014 | Matthews et al. |
| 2014/0156816 A1* | 6/2014 | Lopez Da Silva ... H04L 41/042 709/221 |
| 2014/0225896 A1 | 8/2014 | Zhang et al. |
| 2014/0244218 A1 | 8/2014 | Greenberg et al. |
| 2015/0009796 A1* | 1/2015 | Koponen ............... H04L 63/20 370/216 |
| 2015/0010012 A1 | 1/2015 | Koponen et al. |
| 2015/0032894 A1 | 1/2015 | Rosensweig et al. |
| 2015/0106781 A1 | 4/2015 | Adler et al. |
| 2015/0178366 A1 | 6/2015 | Farahbod et al. |
| 2015/0205596 A1 | 7/2015 | Hiltegen et al. |
| 2015/0220216 A1 | 8/2015 | Wigdor et al. |
| 2015/0249587 A1 | 9/2015 | Kozat et al. |
| 2015/0275806 A1 | 10/2015 | Genslak et al. |
| 2015/0301878 A1 | 10/2015 | Chen et al. |
| 2015/0309969 A1 | 10/2015 | Kahn |
| 2015/0362559 A1 | 12/2015 | Hametner et al. |
| 2016/0042045 A1 | 2/2016 | Adoc et al. |
| 2016/0055226 A1 | 2/2016 | Bruening et al. |
| 2019/0222466 A1* | 7/2019 | Duda ..................... H04L 41/00 |

OTHER PUBLICATIONS

"Arista 7500 Series Technical Specifications", Retrieved From: https://web.archive.org/web/20140205183138/http://www.aristanetworks.com/en/products/7500series/specifications, Retrieved On: Feb. 5, 2014, 2 Pages.

"CPLEX Optimizer", Retrieved From: https://web.archive.org/web/20140307052016/http://www-01.ibm.com/software/commerce/optimization/cplex-optimizer/, Retrieved On: Mar. 7, 2014, 2 Pages.

"Google Official Blog", Retrieved From: http://googleblog.blogspot.in/2014/01/todays-outagefor-several-google.html, Retrieved On: Mar. 11, 2014, 2 Pages.

(56) References Cited

OTHER PUBLICATIONS

"Microsoft Solver Foundation", Retrieved From: https://web.archive.org/web/20130928022310/http://msdn.microsoft.com/en-us/devlabs/hh145003.aspx, Retrieved On: Sep. 28, 2013, 1 Page.
"Network Virtualization With VMware NSX Virtualized Network", Retrieved From: https://web.archive.org/web/20140308013335/http://www.vmware.com/products/nsx/, Retrieved Date: Mar. 8, 2014, 3 Pages.
"Open Flow Switch Specification", Submitted to Stanford University, Feb. 28, 2011, 56 Pages.
"Open-Source SDN Stack", Retrieved From : https://web.archive.org/web/20140212001627/http://onlab.us/tools.html, Retrieved On: Feb. 12, 2014, 4 Pages.
"Summary of the Dec. 24, 2012 Amazon ELB Service Event in The US-East Region", Retrieved From: https://web.archive.org/web/20140217020801/http://aws.amazon.com/message/680587/, Retrieved On: Feb. 17, 2014, 3 pages.
"Non-Final Office Action Issued in U.S. Appl. No. 14/298,762", dated Mar. 10, 2016, 16 Pages.
"Non Final Office Action Issued in U.S. Appl. No. 14/298,794", dated May 25, 2017, 22 Pages.
"Non-Final Office Action Issued in U.S. Appl. No. 14/298,794", dated Mar. 23, 2016, 19 Pages.
"Non-Final Office Action Issued in U.S. Appl. No. 14/298,820", dated Feb. 10, 2016, 12 Pages.
"Non-Final Office Action Issued in U.S. Appl. No. 14/298,820", dated Jul. 7, 2016, 5 Pages.
Agrawal, et al., "Policy-Based Management of Networked Computing Systems", Published in IEEE Communications Magazine, vol. 43, Issue 10, Oct. 24, 2005, pp. 69-75.
Al-Fares, et al., "Hedera: Dynamic Flow Scheduling for Data Center Networks", In Proceedings of the 7th USENIX Conference on Networked Systems Design and Implementation, Apr. 28, 2010, 15 Pages.
Applegate, et al., "Coping With Network Failures: Routing Strategies for Optimal Demand Oblivious Restoration", In Proceedings of the Joint International Conference on Measurement and Modeling of Computer Systems, Jun. 10, 2004, pp. 270-281.
Applegate, et al., "Making Intra-Domain Routing Robust to Changing and Uncertain Traffic Demands: Understanding Fundamental Tradeoffs", In Proceedings of the Conference on Applications, Technologies, Architectures, and Protocols for Computer Communications, Aug. 25, 2003, pp. 313-324.
Atlas, et al., "Basic Specification for IP Fast-Reroute: Loop-Free Alternates", In Network Working Group, RFC 5286, Sep. 2008, 31 Pages.
Baillis, "Eventual Consistency Today: Limtiations, Extensions, And Beyond", In Magazine acmqueue, vol. 11, Issue 3, Apr. 9, 2013, 13 Pages.
Ballani, et al., "CONMan: A Step Towards Network Manageability", In the Proceedings of the Conference on Applications, Technologies, Architectures, and Protocols for Computer Communications, Aug. 27, 2007, pp. 205-216.
Ballani, et al., "Towards Predictable Datacenter Networks", In Proceedings of the ACM SIGCOMM Conference, Aug. 15, 2011, pp. 242-253.
Batcher, K. E.., "Sorting Networks and Their Applications", In the Proceedings of the AFIPS Spring Joint Computer Conference, Apr. 30, 1968, pp. 307-314.
Benson, et al., "Micro TE: Fine Grained Traffic Engineering for Data Centers", In the Proceedings of the 7th Conference on Emerging Networking Experiments and Technologies, Dec. 6, 2011, pp. 1-12.
Bivens, et al., "Scalability and Performance of An Agent-Based Network Management Middleware", In the International Journal of Network Management, vol. 14, Issue 2, Mar. 1, 2004, pp. 131-146.
Caesar, et al., "Design and Implementation of a Routing Control Platform", In Proceedings of the 2nd Symposium on Networked Systems Design & Implementation, May 2, 2005, pp. 15-28.

Casado, et al., "Ethane: Taking Control of the Enterprise", In Proceedings of the Conference on Applications, Technologies, Architectures, and Protocols for Computer Communications, Aug. 27, 2007, pp. 1-12.
Casado, et al., "Fabric: A Retrospective on Evolving SDN", In Proceedings of the First workshop on Hot topics in Software Defined Networks., Aug. 13, 2012, pp. 85-90.
Casado, et al., "Rethinking Enterprise Network Control", Published in IEEE/ACM Transactions on Networking vol. 17, Issue 4, Aug. 1, 2009, pp. 1270-1283.
Casado, et al., "SANE: A Protection Architecture for Enterprise Networks", In the Proceedings of the 15th conference on USENIX Security Symposium, vol. 15, Article 10, Jul. 31, 2006, 15 Pages.
Curtis, et al., "DevoFlow: Scaling Flow Management for High-Performance Networks", In Proceedings of the ACM SIGCOMM conference, Aug. 15, 2011, pp. 254-265.
Dobrescu, et al., "Toward a Verifiable Software Dataplane", In Proceedings of the Twelfth ACM Workshop on Hot Topics in Networks, Nov. 21, 2013, 7 Pages.
Elwalid, et al., "MATE: MPLS Adaptive Traffic Engineering", In the Proceedings of 20th Annual Joint Conference of be IEEE Computer and Communciations Societies, Apr. 22, 2001, 10 Pages.
Even, et al., "On the Complexity of Time Table and Multi-Commodity Flow Problems", In the Proceedings of the 16th Annual Suymposium on Foundations of Computer Science, Oct. 13, 1975, pp. 184-193.
Feamster, et al., "Detecting BGP configuration Faults With Static Analysis", In Proceedings of the 2nd Conference on Symposium on Networked Systems Design & Implementation—vol. 2, May 2, 2005, pp. 43-56.
Feamster, et al., "The Road to SDN: An Intellectual History of Programmable Networks", in ACM SIGCOMM Computer Communication Review, vol. 44, Issue 2, Apr. 8, 2014, pp. 87-98.
Ferguson, et al., "Participatory Networking: An API for Application Control of SDNs", In Proceedings of the ACM SIGCOMM Conference on SIGCOMM, Aug. 12, 2013, pp. 327-338.
Francois, et al., "Avoiding Disruptions During Maintenance Operations on BGP Sessions", Published in IEEE Transactions on Network and Service Management, vol. 4, Issue 3, Dec. 2007, pp. 1-11.
Francois, et al., "Avoiding Transient Loops During the Convergence of Link-State Routing Protocols", Published in IEEE/ACM Transactions on Networking, vol. 15, Issue 6, Dec. 2007, pp. 1280-1292.
Francois, et al., "Disruption Free Topology Reconfiguration in OSPF Networks", In Proceedings of the 26th IEEE International Conference on Computer Communications, May 6, 2007, 9 Pages.
Reitblatt, et al., "Abstractions for Network Update", In Proceedings of the ACM SIGCOMM Conference on Applications, Technologies, Architectures, and Protocols for Computer Communication, Aug. 13, 2012, pp. 323-334.
Reitblatt, et al., "Consistent Updates for Software-Defined Networks: Change You Can Believe In!", In the Proceedings of the 10th ACM Workshop on Hot Topics in Networks, Nov. 14, 2011, 6 Pages.
Rotsos, et al., "OFLOPS: An Open Framework for Open Flow Switch Evaluation", In Proceedings of the 13th International Conference on Passive and Active Measurement, Mar. 12, 2012, pp. 85-95.
Sharafat, et al., "MPLS-TE and MPLS VPNS With Openflow", In Proceedings of the ACM SIGCOMM Conference, Aug. 15, 2011, pp. 452-453.
Sherwood, et al., "Can the Production Network Be the Testbed?", In Proceedings of the 9th USENIX Conference on Operating Systems Design and Implementation, Oct. 4, 2010, 14 Pages.
Stribling, et al., "Flexible, Wide-Area Storage for Distributed Systems With WheelFS", In Proceedings of the 6th USENIX Symposium on Networked Systems Design and Implementation, Apr. 22, 2009, pp. 43-58.
Suchara, et al., "Network Architecture for Joint Failure Recovery and Traffic Engineering", In Proceedings of the ACM SIGMETRICS Joint International Conference on Measurement and Modeling of Computer Systems, Jun. 7, 2011, pp. 97-108.

(56) References Cited

OTHER PUBLICATIONS

Susitaival, et al., "Adaptive Load Balancing With OSPF", In Book Traffic and Performance Engineering for Heterogeneous Networks, Jan. 2004, pp. 85-107.

Takita, et al., "Network Reconfiguration Targeting Minimum Connection Disruption", In Proceedings of the IEEE International Conference on Optical Network Design and Modeling, May 19, 2014, pp. 198-203.

Tarjan, Robert, "Depth-First Search and Linear Graph Algorithms", In SIAM Journal on Computing, vol. 1, Issue 2, Jun. 1972, pp. 146-160.

Terry, Doug, "Replicated Data Consistency Explained Through Baseball", In Microsoft Technical Report, MSR-TR-2011-137, Oct. 1, 2011, 14 Pages.

Turner, et al., "California Fault Lines: Understanding the Causes and Impact of Network Failures", In Proceedings of the ACM SIGCOMM Conference, Aug. 30, 2010, 12 Pages.

Vanbever, et al., "Lossless Migrations of Link-State IGPs", Published in IEEE/ACM Transactions on Networking, vol. 20, Issue 6, Dec. 6, 2012, 14 Pages.

Vanbever, et al., "Seamless Network-Wide IGP Migrations", In Proceedings of the ACM SIGCOMM Conference, Aug. 15, 2011, pp. 314-325.

Voellmy, et al., "Maple: Simplifying SDN Programming Using Algorithmic Policies", In the Proceedings of the ACM SIGCOMM Conference on SIGCOMM, Aug. 12, 2013, pp. 87-98.

Wang, et al., "COPE: Traffic Engineering in Dynamic Networks", In the Proceedings of the Conference on Applications, Technologies, Architectures, and Protocols for Computer Communciations, Sep. 11, 2006, 24 Pages.

Wang, et al., "R3: Resilient Routing Reconfiguration", In Proceedings of the ACM SIGCOMM 2010 conference, Aug. 30, 2010, pp. 291-302.

Zhang-Shen, et al., "Designing a Fault-Tolerant Network Using Valiant Load-Balancing", In Proceedings of the 27th IEEE Conference on Computer Communications, Apr. 13, 2008, 5 Pages.

Ghorbani, et al., "Walk the Line: Consistent Network Updates With Bandwidth Guarantees", In Proceedings of the first workshop on Hot topics in Software Defined Networks, Aug. 13, 2012, 6 Pages.

Gill, et al., "Understanding Network Failures in Data Centers: Measurement, Analysis, and Implications", In Proceedings of the ACM SIGCOMM Conference, Aug. 15, 2011, pp. 350-361.

Greenberg, et al., "A Clean Slate 4D Approach to Network Control and Management", In ACM SIGCOMM computer Communication Review, vol. 35, Issue 5, Oct. 6, 2005, pp. 41-54.

Gude, et al., "NOX: Towards an Operating System for Networks", In ACM SIGCOMM Computer Communication Review, vol. 38, Issue 3, Jul. 1, 2008, pp. 105-110.

Heller, et al., "Elastic Tree: Saving Energy in Data Center Networks", In the Proceedings of the 7th USENIX Conference on Networked Systems Design and Implementation, Apr. 28, 2010, 16 Pages.

Hong, et al., "Achieving High Utilization With Software-Driven WAN", In Proceedings of the ACM SIGCOMM Conference on SIGCOMM, Aug. 12, 2013, pp. 15-26.

Hunt, et al., "Zookeeper: Wait-Free Coordination for Internet-Scale Systems", In Proceedings of the USENIX Conference on USENIX Annual Technical Conference, vol. 8, Issue 9, Jun. 23, 2010, 14 Pages.

Jain, et al., "B4: Expereince With a Globally-Deployed Software Defined WAN", In Proceedings of the ACM SIGCOMM Conference on SIGCOMM, Aug. 12, 2013, pp. 3-14.

Jin, et al., "Dynamic Scheduling of Network Updates", In Proceedings of the ACM Conference on SIGCOMM, Aug. 17, 2014, pp. 539-550.

John, et al., "Consensus Routing: The Internet As a Distributed System", In Proceedings of the 5th USENIX Symposium on Networked Systems Design and Implementation, Apr. 16, 2008, pp. 351-364.

Kandula, et al., "Flyways to De-Congest Data Center Networks", In Microsoft Corporation Technical Report No. MSR-TR-2009-109, Aug. 1, 2009, 6 pages.

Kandula, et al., "Walking the Tightrope: Responsive Yet Stable Traffic Engineering", In Proceedings of the Conference on Applications, Technologies, Architectures, and Protocols for Computer Communications, Aug. 22, 2005, 12 Pages.

Kar, et al., "Routing Restorable Bandwidth Guaranteed Connections Using Maximum 2-Route Flows", Published in IEEE/ACM Transaction on Networking (TON), vol. 11, Issue 5, Oct. 1, 2003, 11 Pages.

Katta, et al., "Incremental Consistent Updates", In the Proceedings of the 2nd ACM SIGCOMM Workshop on Hot Topics in Software Defined Networking, Aug. 16, 2013, pp. 49-54.

Kazemian, et al., "Header Space Analysis: Static Checking for Networks", In Proceedings of the 9th USENIX Conference on Networked Systems Design and Implementation, vol. 12, Apr. 25, 2012, 14 Pages.

Kazemian, et al., "Real Time Network Policy Checking Using Header Space Analysis", In Proceedings of the 10th USENIX Conference on Networked Systems Design and Implementation, Apr. 2, 2013, pp. 99-112.

Khurshid, et al., "Veri Flow: Verifying Network-Wide Invariants in Real Time", In Proceedings of 10th USENIX Symposium on Networked Systems Design and Implementation, Apr. 2, 2013, 13 Pages.

Kodialam, et al., "Dynamic Routing of Restorable Bandwidth-Guaranteed Tunnels Using Aggregated Network Resources Usage Information", Published in IEEE/ACM Transactions on Networking (TON), vol. 11, Issue 3, Jun. 2003, pp. 399-410.

Kodialam, et al., "Efficient and Robust Routing of Highly Variable Traffic", In Proceedings of the 3rd Workshop on Hot Topics in Networks, 2004, 6 Pages.

Koponen, et al., "Network Virtualization in Multi-Tenant Data Centers", In Proceedings of the 11th USENIX Conference on Networked Systems Design and Implementation, Apr. 2, 2014, pp. 203-216.

Koponen, et al., "Onix: A Distributed Control Platform for Large-Scale Production Networks", In Proceedings of the 9th USENIX Conference on Operating Systems Design and Implementation, vol. 10, Oct. 4, 2010,, pp. 351-364.

Kushman, et al., "R-BGP: Staying Connected in a Connected World", In Proceedings of the 4th USENIX Conference on Networked Systems Design & Implementation, Apr. 11, 2007, 14 Pages.

Lim, et al., "Congestion-Free Routing Reconfiguration: Formulation and Examples", In Proceedings of the IEEE 48th Annual Conference on Information Sciences and Systems, Mar. 19, 2014, 6 Pages.

Liu, et al., "zUpdate: Updating Data Center Networks With Zero Loss", In Proceedings of the ACM SIGCOMM Conference on SIGCOMM, Aug. 12, 2013, pp. 411-422.

Mahajan, et al., "On Consistent Updates in Software Defined Networks?", In Proceedings of the Twelfth ACM Workshop on Hot Topics in Networks, Nov. 21, 2013, 7 Pages.

Mal, et al., "Debugging the Data Plane With Anteater", In Proceedings of the ACM SIGCOMM Conference, Aug. 15, 2011, pp. 290-301.

Markopoulou, et al., "Characterization of Failures in an Operational IP Backbone Network", Published in IEEE/ACM Transactions on Networking, vol. 16, Issue 4, Aug. 2008, pp. 749-762.

McGeer, Rick, "A Correct, Zero-Overhead Protocol for Network Updates", In the Proceedings of the 2nd ACM SIGCOMM 2013 Workshop on Hot Topics in Software Defined Networking, Aug. 16, 2013, pp. 161-162.

McGeer, Rick, "A Safe, Efficient Update Protocol for Open Flow Networks", In Proceedings of the first workshop on Hot topics in Software Defined Networks, Aug. 13, 2012, pp. 61-66.

McKeown, et al., "Open Flow: Enabling Innovation in Campus Networks", In Newsletter ACM SIGCOMM Computer communication Review, vol. 38, Issue 2, Apr. 2008, pp. 69-74.

Mitchkutzko, Jdugan, "Iperf", Retrieved From: https://web.archive.org/web/20140218015110/http://sourceforge.net/projects/iperf/?, Retrieved on: Feb. 18, 2014, 3 Pages.

(56) References Cited

OTHER PUBLICATIONS

Mizrahi, et al., "Time-based Updates in Software Defined Networks", In the Proceedings of the 2nd ACM SIGCOMM 2013 Workshop on Hot Topics in Software Defined Networking, Aug. 16, 2013, pp. 163-164.

Mogul, et al., "Corybantic: Towards Modular Composition of SDN Control Programs", In Proceedings of the 12th ACM Workshop on Hot Topics in Networks, Nov. 21, 2013, 7 Pages.

Monsanto, et al., "Composing Software-Defined Networks", In Proceedings of the 10th USENIX Conference on Networked Systems Design and Implementation, Apr. 2, 2013, pp. 1-13.

Newman, Mark, "Chapter 7 Measures and Metrics", In Book Networks: An Introduction, Oxford University Press, May 20, 2010, pp. 167-240.

Noyes, et al., "Toward Synthesis of Network Updates", In Proceedings of the 2nd Workshop on Synthesis, Mar. 31, 2014, 16 Pages.

Patel, et al., "Ananta: Cloud Scale Load Balancing", In Proceedings of the ACM SIGCOMM Conference on SIGCOMM, Aug. 12, 2013, pp. 207-218.

"International Preliminary Report on Patentability Issued in PCT Application No. PCT/US2015/033860", dated Aug. 19, 2016, 9 Pages.

"International Search Report & Written Opinion Issued in PCT Application No. PCT/US2015/033860", dated Oct. 21, 2015, 12 Pages.

"Second Written Opinion Issued in PCT Application No. PCT/US2015/033860", dated Apr. 18, 2016, 5 Pages.

"International Search Report and Written Opinion Issued in PCT Application No. PCT/US2015/034088", dated Sep. 8, 2015, 12 Pages.

"International Preliminary Report on Patentability Issued in PCT Application No. PCT/US2015/034089", dated May 26, 2016, 7 Pages.

"International Search Report and Written Opinion Issued in PCT Application No. PCT/US2015/034089", dated Sep. 10, 2015, 11 Pages.

Peresini, et al., "ESPRES: Easy Scheduling and Prioritization for SDN", In the Proceedings of Open Networking Summit, Research Track, Mar. 2, 2014, 2 Pages.

Radetzki, Martin, "Fault-Tolerant Differential Q Routing in Arbitrary NoC Topologies", In Proceedings of IFIP 9th International Conference on Embedded and Ubiquitous Computing, Oct. 24, 2011, pp. 33-40.

Raghavan, et al., "Cloud Control With Distributed Rate Limiting", In Proceedings of the Conference on Applications, Technologies, Architectures, and Protocols for Computer Communications, vol. 37, Issue 4, Aug. 27, 2007, 12 Pages.

Raghavan, et al., "Software-Defined Internet Architecture: Decoupling Architecture From Infrastructure", In the Proceedings of the 11th ACM Workshop on Hot Topics in Networks, Oct. 29, 2012, pp. 43-48.

Raza, et al., "Graceful Network State Migrations", Published in IEEE/ACM Transactions on Networking vol. 19, Issue 4, Aug. 2011, pp. 1097-1110.

\* cited by examiner

DYNAMIC SCHEDULING OF NETWORK UPDATES

PRIORITY APPLICATION

This patent application is a continuation application of, and claims priority to, co-pending, commonly owned U.S. patent application Ser. No. 14/298,794, entitled "DYNAMIC SCHEDULING OF NETWORK UPDATES", filed on Jun. 6, 2014, which is incorporated herein by reference in its entirety.

BACKGROUND

As electronic services (e.g., search services, electronic mail services, social networking services, cloud computing services, etc.) continue to expand, providers of the electronic services operate networks of devices to provide the electronic services. A provider or a manager of a network maintains the network by continuously updating inter-connected devices within the network. However, network service interruptions and/or failures often occur when implementing a network update across multiple devices at least because the network update is unable to adapt to run-time differences related to an amount of time it takes individual devices to apply and complete an update. For example, an update to a first device may take a longer amount of time than expected (e.g., more than an average amount of time) because of a current load on hardware resources of the first device. In another example, an update to the first device may not be completed at all. Consequently, an update to a second device may be affected by the unsuccessful or delayed update to the first device, and therefore, the network may experience a service interruption or a failure.

SUMMARY

The techniques and/or systems described herein are configured to determine a set of update operations to transition a network from an observed network state to a target network state and to generate an update dependency graph used to dynamically schedule the set of update operations based on constraint(s) defined to ensure reliability of the network during the transition. The techniques and/or systems dynamically schedule the set of update operations based on feedback. For example, the feedback may include an indication that a previously scheduled update operation has been delayed, has failed, or has been successfully completed.

In various embodiments, an update dependency graph may include multiple orderings in which a set of update operations can be scheduled. For instance, a first ordering may be associated with a first subset of update operations and a second ordering may be associated a second subset of update operations. At least one update operation may be included in both the first subset of update operations and the second subset of update operations such that it can be dynamically scheduled based on the first ordering or the second ordering. Stated another way, at least one update operation may be a child update operation that depends on successful completion of one of multiple parent update operations, e.g., a first parent update operation included in the first ordering or a second parent update operation included in the second ordering.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is presented with reference to accompanying figures. In the figures, the left-most digit(s) of a reference number identifies the figure in which the reference number first appears. The use of the same reference numbers in different figures indicates similar or identical items.

DETAILED DESCRIPTION

Figure 1:
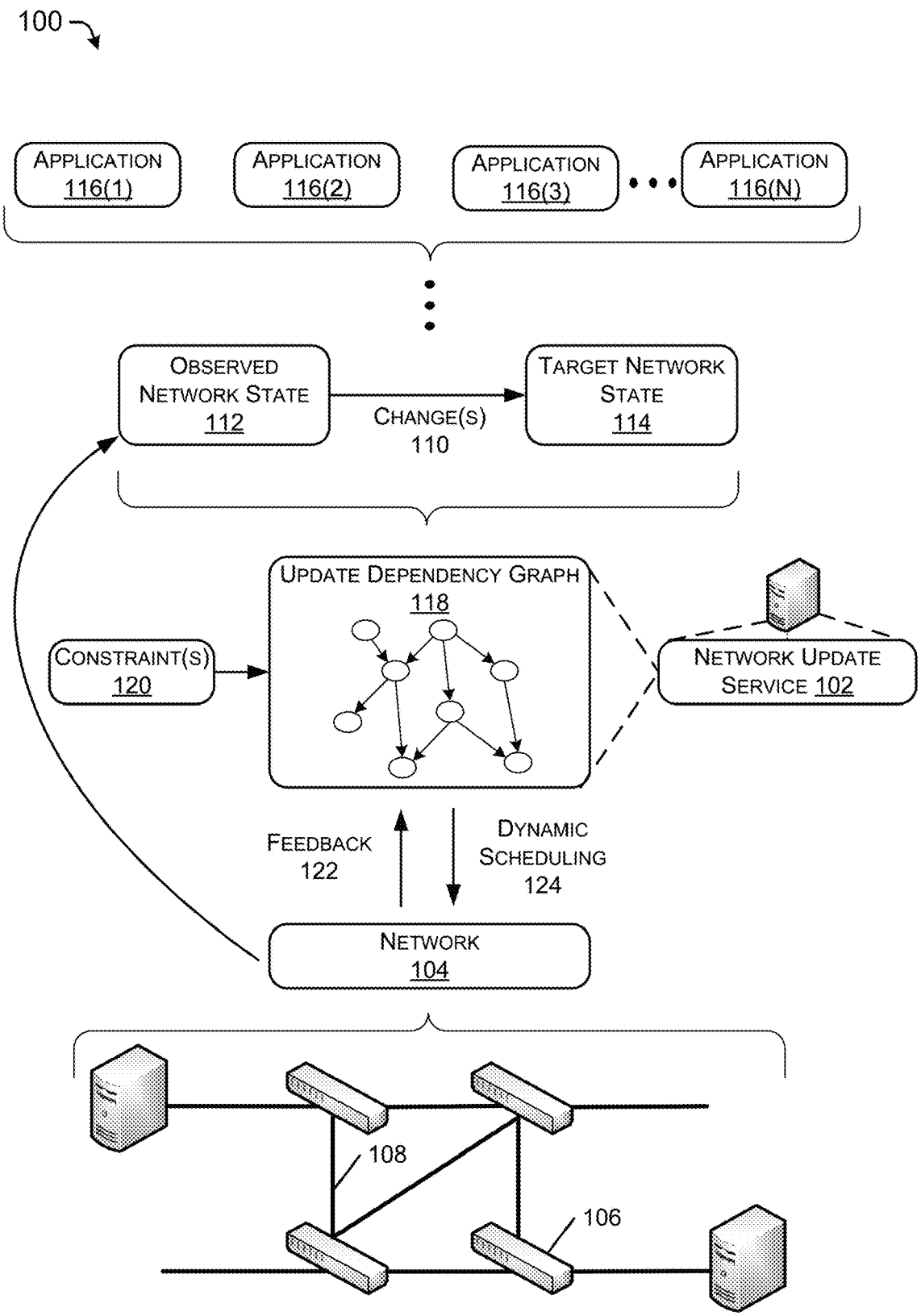
FIG. 1 illustrates an example diagram showing a network update service configured to dynamically schedule individual update operations of a network update on a network, in accordance with various embodiments.

The techniques and/or systems described herein implement a network update service configured to generate an update dependency graph associated with update operations that transition (e.g., move) a state of a network from an observed network state to a target network state. The network update service uses the update dependency graph to dynamically schedule individual update operations so the network update can be implemented. The network update service generates the update dependency graph based on one or more constraints that are defined to ensure that implementation of the network update is reliable (e.g., reduces a chance that a network interruption or a network failure occurs). Using the update dependency graph, the network update service may dynamically schedule the individual update operations that comprise the network update based on feedback received from the devices in the network.

Stated another way, the update dependency graph may be a guide or navigational tool used by the network update service to dynamically select, during run-time, one or more next or subsequent update operations to implement based on received feedback associated with previously implemented update operations. For instance, the feedback may indicate that (i) an individual update operation has failed and not been successfully completed, (ii) an individual update operation has been delayed and not yet completed (e.g., but has not failed), or (iii) an individual update operation has been successfully completed. Based on the feedback received, the network update service may access and use the update dependency graph to dynamically identify and schedule a next update operation.

A first conventional approach to updating a network includes a "one shot" approach that determines a set of differences between an observed state of a network and a target state of a network and applies the differences to the relevant devices all at once or all at the same time (e.g., hence the terminology "one shot"). This conventional one shot approach to updating a network requires that updates to individual devices within the network are successfully completed at the same time. However, in most cases, device updates do not occur at the same time at least because the devices take different amounts of time to implement an update due to different hardware capabilities, different control loads on device resources, communication latencies (e.g., remote procedure call (RPC) delays), etc. Consequently, the conventional "one shot" approach is not reliable or safe at least because an update to a second device may depend on a successfully completed update to a first device in order to ensure network reliability and safety. If the update to the first device takes longer to implement than the update to the second device (i.e., the updates do not occur at the same time), or if the update to the first device is delayed or fails, the network may operate within a "transient" time period between a time when a successful update to the second device is completed and a later time when the update to the first device is eventually completed (e.g., five second transient time period, ten second transient time period, thirty second transient time period, a minute transient time period, etc.). Transient time periods often lead to network interruptions or failures such as routing loops, black holes, and/or congestion. Thus, while the conventional "one shot" approach attempts to implement a network update efficiently or all at once, it is unable to ensure that the network update is implemented reliably and safely.

A second conventional approach to updating a network improves reliability and safety, but is inefficient. This second conventional approach is a multi-step approach to updating a network where the network update is divided into different steps and the steps are statically ordered as part of fixed schedule that is predetermined before the update to the network begins. For example, after generating the fixed schedule, the second conventional approach may implement a first predetermined step of the network update (e.g., update a first device), wait for an indication that the first predetermined step was successfully completed, then implement a second predetermined step of the network update (e.g., update a second device), wait for an indication that the second predetermined step was successfully completed, then implement a third predetermined step of the network update, and so forth until the whole network update is completed. While the second conventional approach may improve reliability and safety of the network update, it is inefficient and slow because the fixed schedule is incapable of adapting to run-time conditions. For example, if an issue arises and completion of the first predetermined step is unsuccessful or is delayed, then subsequent predetermined steps in the fixed schedule are either unable to be implemented or must wait to be implemented. In some instances, a delayed or failed first predetermined step may be referred to as a straggler step. Or a device associated with a delayed or failed first predetermined step may be referred to as a straggler device. In many cases, by the time the straggler steps and/or the straggler devices catch up (e.g., an update is eventually completed successfully), the subsequent predetermined steps in the fixed schedule may be irrelevant (e.g., old updates, not meaningful, etc.). Thus, while being reliable and safe, the conventional approach that statically orders steps as part of a fixed schedule is also inefficient at least because it does not allow the fixed schedule to be modified, e.g., to account for a straggler step and/or a straggler device.

The network update service described herein is configured to implement a dynamic scheduling approach to implementing a network update. The network update service generates and uses an update dependency graph to dynamically schedule various update operations that comprise the network update. Put another way, the network update service is configured to access the update dependency graph after the network update has already begun to select and schedule a next update operation based on received feedback associated with update operations have already been scheduled (e.g., network update run-time conditions).

Unlike the "one shot" conventional approach discussed above, the update operations discussed herein are not all initiated at the same time. Furthermore, unlike the "static order" conventional approach above, the update operations discussed herein are not part of a fixed schedule that is predetermined before the network update is started. Rather, the update dependency graph may include various orderings of update operations and the network update service may dynamically schedule update operations based on one or more of the orderings after considering received feedback. For example, if a problem or a road-block arises along a first ordering and the network update service determines, e.g., at run-time, that an update operation that is part of the first ordering is delayed or has failed, then the network update service can use the update dependency graph to identify a second ordering and dynamically find an acceptable way to continue the network update even in light of a delayed or failed update operation. Therefore, one or more yet to be scheduled update operations that depend on the delayed or failed update operation, and that consequently cannot be scheduled via the first ordering, may be able to be scheduled in accordance with dependencies defined in a second ordering.

The network update service generates the update dependency graph based on dependencies resulting from defined constraints. In various embodiments, nodes of the update dependency graph correspond to update operations and edges between the nodes represent dependencies between the update operations (e.g., a first update operation is to be implemented before a second update operation). In various embodiments, nodes of the update dependency graph correspond to resource availability of a network element (e.g., a device or a communication path) such as link bandwidth availability and/or memory availability.

In various implementations, the network update service may define the constraints based on network consistency properties. To be consistent, a network update has to comply with, or not violate, properties established to protect the network from an interruption or a failure. A first example property may be a loop freedom property indicating that packets communicated in the network should not loop. A second example property may be a congestion freedom property indicating that traffic communicated via a link between two devices cannot exceed a predetermined and/or maximum capacity. Consequently, constraints may be defined based on these example properties and the constraints may impose dependencies on an order in which update operations can be implemented. For instance, a constraint may be defined to ensure that an update operation that brings a new flow to a link must occur after an update operation that removes an existing flow from the link (e.g., if the link cannot support both flows simultaneously due to a resource capacity limitation). Accordingly, the network update service is configured to use the update dependency graph to dynamically schedule a next update operation while respecting dependencies established based on defined constraints.

FIG. 1 illustrates an example diagram 100 that includes a network update service 102 configured to dynamically schedule individual update operations of a network update on a network 104. The network 104 may comprise a variety of devices 106 and communications paths 108. A communication path 108 may be associated with a direct link that connects two devices or may comprise an indirect link that connects two devices in which traffic is communicated via at least one intermediary device located between the two devices. In one implementation, a communication path 108 may comprise a communication tunnel established through, or for, two or more devices 106.

In various embodiments, the network 104 being managed may be a large production network such as a data-center network (DCN), an Internet service provider (ISP) network, an enterprise network (e.g., a cloud service) or any other administrative domain that may be under control of an entity (e.g., an entity that operates and maintains devices executing the network update service 102). The devices 106 may be physical network devices such as a switching device (a switch), a routing device (a router), a gateway device (a gateway), a bridging device (a network bridge), a hub device (a network hub), a firewall device, a network address translator device (a NAT), a multiplexing device (a multiplexer), a wireless access point device (a WAP), a proxy server device, a file server device, a database server device, a storage device, etc. The devices 106 may also be end-user devices capable of connecting to the network 104. For instance, an end-user device may comprise a mobile or portable device such as a smart phone, a cellular phone, a personal digital assistant (PDA), an electronic book device, a laptop computing device, a tablet computing device, a personal media player device, etc. Or, an end-user device may comprise a stationary device such as a desktop computing device, a gaming console device, a digital video recording device (a DVR), a set top box device, etc. Therefore, the network 104 may comprise tens, hundreds or thousands of devices connected to one another to comprise a domain or an administrative network.

When updating the network 104, the network update service 102 is configured to determine changes 110 that transition a state of a network from an observed network state 112 to a target network state 114. As used herein, the "state" of a network 104 is dependent on the states of individual devices 106 and/or individual communication paths 108 within the network 104. In various implementations, an individual device 106 or an individual communication path 108 may have one or more state variables and at any given time a state variable may be any one of various values. In various embodiments, a state variable is defined as a component of a device 106 or a communication path 108 for which a value can be read and/or written (e.g., a controllable value that can be changed from an observed value to a target value desired that is different than the observed value). Accordingly, a change 110 may be associated with changing a state variable from a first value to a second value. A change to a state variable may be a direct change such that the first value is changed to a second value. Or, a change to a state variable may be an indirect change such that the first value to a second value via an intermediate value that is neither the first value nor the second value.

For example, a device 106 may comprise a power state variable that indicates whether the device 106 is powered on or powered off. Thus, a first value for the power state variable may indicate the device 106 is powered on and a second value for the power state variable may indicate the device 106 is powered off. These different values can be read from the device 106 (e.g., observed) and/or written to the device 106. In another example, a device 106 may comprise a routing state variable that indicates one of various communication paths for which a device 106 is to use to transmit data (e.g., an ingress switching device). Thus, a first value for the routing state variable may indicate the device 106 is to transmit data (e.g., a traffic flow) to another device in the network using a first communication path and a second value for the routing state variable may indicate the device 106 is to transmit data to the other device in the network using a second communication path that is different than the first communication path.

In various embodiments, the target network state 114 may be generated based on state variable value changes requested and/or proposed by various applications 116(1) . . . 116(N). An application (e.g., one of 116(1) . . . 116(N)) may be responsible for managing and controlling a particular aspect or function of the network 104 so that the network 104 operates efficiently and reliably. In various embodiments, the particular aspect or function of the network 104 managed and controlled by an individual application (e.g., one of 116(1) . . . 116(N)) may be associated with a single device 106 and/or a single communication path 108 of the network 104 or a subset of the devices 106 and/or a subset of communication paths 108 of the network (e.g., a particular type of devices such as switching devices).

An application (e.g., one of 116(1) . . . 116(N)) may be classified as a routing management application that manages switch forwarding rules for the devices 106 (e.g., switching devices) and/or the communication paths 108 of the network 104. For example, a traffic-engineering application may be a routing management application that is configured to steer traffic along different communication paths 108 (e.g., a communication tunnel established through/for two or more devices 106) to improve network utilization and/or ensure that performance requirements are satisfied. In another example, a server load balancing application may be a routing management application that divides (e.g., equally) a communication load (e.g., traffic) across devices (e.g., a group of servers processing requests for data).

An application (e.g., one of 116(1) . . . 116(N)) may be classified as an infrastructure management application that manages the network infrastructure of devices 106 and/or communication paths 108 of the network 104. For example, a power management application may be an infrastructure management application that is configured to turn a switching device or off at any given time in order to mitigate a failure or save energy. In another example, a switch upgrade application may be an infrastructure management application that is responsible for installing a new operating system (i.e., firmware) on a switching device.

The applications described above are provided herein as example applications, and it is contemplated that other applications developed to control an aspect or a function of a network may also benefit from the techniques and/or systems described in this document.

In various embodiments, the network update service 102 may determine the changes 110 by calculating differences between the observed network state 112 and the target network state 114. The calculated differences may be the differences between one or more observed state variable values and one or more corresponding desired state variable values to be written to the network 104. Put another way, given the observed network state 112 and the target network state 114 as inputs, the network update service 102 may compute a set of update operations based on the changes 110. Then, the network update service 102 is configured to generate an update dependency graph 118 based on one or more defined constraints 120. For instance, the network update service 102 is configured to determine dependencies between update operations based on the constraints and generate one or more acceptable and reliable orderings that inter-link the update operations.

The constraints 120 may be defined by an entity operating the network update service 102, an entity being served by the network 104, and/or one of the applications 116(1) . . . 116(N). As discussed above, the constraints 120 may be defined in light of properties and/or policies configured to ensure that the network 104 operates reliably, safely and efficiently. For example, consistency related properties may include, but are not limited to, one or more of (i) a black hole freedom property that ensures that communication units (e.g., data packets) are not dropped at a device (e.g., a switching device), (ii) a loop freedom property that ensures that communication units are not looped within the network; (iii) a packet coherence property that ensures that communication units are not transmitted in the network based on a mix of an old routing instruction (e.g., that is part of an observed network state) and a new routing instruction (e.g., that is part of the target network state), (iv) a congestion freedom property that ensures that the routing of communication units within the network do not cause congestion (e.g., a link is not congested due to exceeding a bandwidth limitation), and (v) a memory overload that ensures that available memory resources at a device is sufficient to meet memory needs associated with a target state.

The update dependency graph 118 is comprised of multiple nodes and edges. In various embodiments, the nodes of the update dependency graph 118 may be operation type nodes. An operation node represents an update operation to be scheduled, the update operation being associated with one or more changes to be written to the network 104 (e.g., a new value proposed by an application). For example, an operation node may be associated with a change to a traffic routing state variable at a switching device (e.g., an addition, deletion or modification of a traffic forwarding rule that moves traffic flow from a first communication path to a second communication path). A second type of node includes a resource node that may be associated with resource availability at one or more devices. For example, a resource node may indicate an amount of available memory based on a current memory load or an amount of available communication bandwidth based on a current load.

An edge between two operation nodes in the update dependency graph 118 represents an operation dependency between two update operations to be implemented and thereby signals that a first update operation (e.g., a parent update operation of a parent node) is to be implemented before a second update operation (e.g., a child update operation of child node that depends upon successful completion the parent update operation). An edge between a resource node and an operation node in the update dependency graph 118 represents a resource dependency. For instance, an edge that starts at an operation node and ends at, or leads to, a resource node may have an associated label indicating an amount of the resource that will be freed or become available (e.g., resource available for use) after the update operation represented by the operation node at which the edge starts is successfully completed. An edge that starts at a resource node and ends at, or leads to, an operation node may have an associated label indicating an amount of available resource required before an update operation being represented by the operation node at which the edge ends can be implemented (e.g., resource needed for consumption). In various embodiments, the update dependency graph 118 may solely include operation nodes if no resource constraints are defined (e.g., a constraint defined based on a congestion freedom property). In other embodiments, the update dependency graph 118 may include operation nodes and resource nodes.

Once generated, the update dependency graph 118 may comprise multiple acceptable and reliable orderings which can be followed to implement the network update. Stated another way, the network update service 102 may be provided with various ways to navigate the update dependency graph 118. Therefore, the network update service 102 is able to dynamically, e.g., based on run-time conditions, select a next update operation to schedule.

For example, if successful completion of an update operation is delayed or stalled and subsequent update operations along a first ordering depend upon the delayed or stalled update operation, then the network update service 102 may access the update dependency graph 118 to identify a second ordering (e.g., a different route or solution in the graph) that does not include the delayed or stalled update operation but still leads to the subsequent update operations. Thus, the network update service 102 uses the update dependency graph 118 to dynamically find a way around (e.g., an alternative ordering) the delayed or stalled update operation so the subsequent update operations can still be scheduled. Thus, the network update service 102 described herein does not use a fixed schedule to implement the network update. Rather, as long as the network update service 102 maintains the update dependency graph 118 based on computed changes 110 that transition a state of a network from the observed network state 112 to the target network state 114, the network update service 102 can implement a network update more efficiently while also ensuring the network update is safe and reliable.

The network update service 102 is configured to use the update dependency graph 118 to dynamically schedule update operations based on feedback 122 received from the network 104. The feedback 122 may be explicit feedback provided by elements (e.g., devices 106) of the network 104 which may include an indication that (i) an update operation has been successfully completed (e.g., on time, within a predetermined amount of time), (ii) the update operation has not yet been completed but is still being in the process of being implemented (e.g., the update is delayed, will not be completed in a predetermined or expected amount of time), or (iii) the update operation has failed and cannot be successfully completed. The feedback 122 may also, or alternatively, be implied feedback such that the network update service 102 monitors the progress of individual update operations and observes whether the update operation has been successfully or unsuccessfully completed or whether the update operation has been delayed (e.g., not completed with an expected or predetermined amount of time).

Based on the feedback 122, the network update service 102 can use the update dependency graph 118 to select a next update operation and dynamically schedule 124 the next update operation so that the network update can continue. Accordingly, the network update service 102 implements a more efficient and reliable approach to updating a network or a part of a network at least because it determines multiple reliable orderings (e.g., that respect dependencies) in which the network update can be implemented and it uses the orderings to dynamically select a next operation update to be implemented in light of feedback 122 received from the network (e.g., a switching device is currently delayed in implementing an already scheduled update operation).

Figure 2:
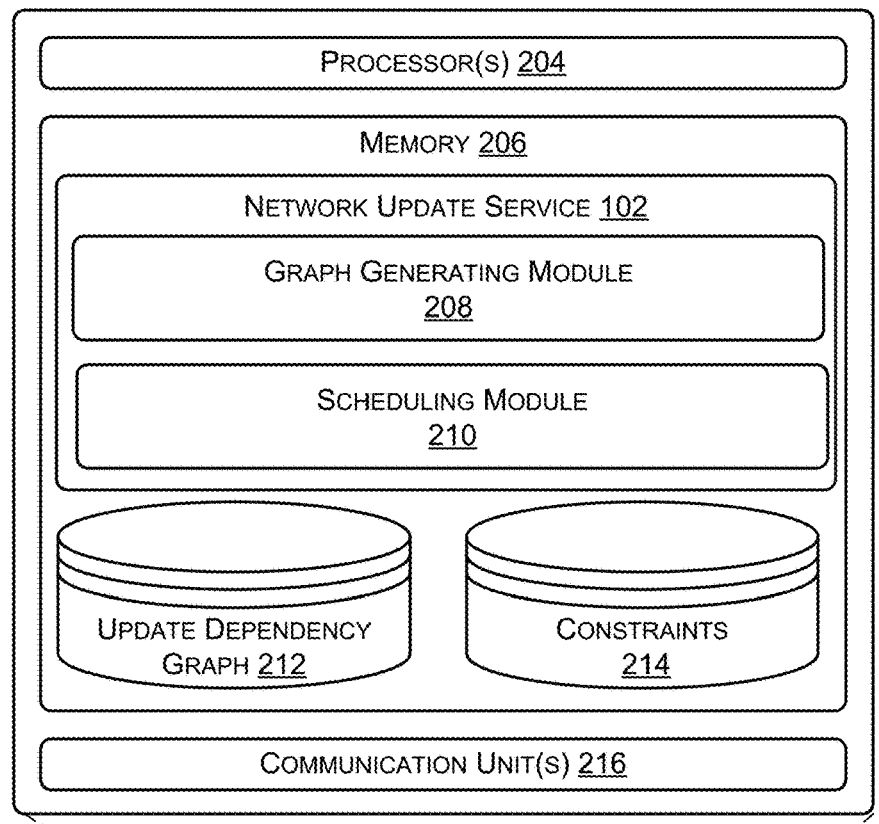
FIG. 2 illustrates an example diagram showing an environment that describes components of one or more devices configured to implement the network update service, in accordance with various embodiments.

FIG. 2 is a diagram showing an example environment 200 that implements the network update service 102 described above. In various embodiments, the network update service 102 may be implemented via one or more devices 202. A device 202 may comprise a stationary device such as a desktop computing device, a server computing device, or the like. A device 202 may alternatively comprise a mobile or portable device such as a laptop computing device, a tablet computing device, a smart phone device, a cellular phone device, a personal digital assistant (PDA) device, an electronic book device, or the like.

The device(s) 202 include the network update service 102 configured to implement the techniques described herein. A device 202 may individually and separately include one or more processor(s) 204 and memory 206. The processor(s) 204 may be a single processing unit or a number of units, each of which could include multiple different processing units. The processor(s) 204 may include a microprocessor, a microcomputer, a microcontroller, a digital signal processor, a central processing unit (CPU), a graphics processing unit (GPU), a security processor etc. Alternatively, or in addition, some or all of the techniques described herein can be performed, at least in part, by one or more hardware logic components. For example, and without limitation, illustrative types of hardware logic components that can be used include a Field-programmable Gate Array (FPGA), an Application-specific Integrated Circuit (ASIC), an Application-specific Standard Products (ASSP), a state machine, a Complex Programmable Logic Device (CPLD), other logic circuitry, a system on chip (SoC), and/or any other devices that perform operations based on instructions. Among other capabilities, the processor(s) 204 may be configured to fetch and execute computer-readable instructions stored in the memory 206.

The memory 206 may include one or a combination of computer-readable media. As used herein, "computer-readable media" includes computer storage media and communication media.

Computer storage media includes volatile and non-volatile, removable and non-removable media implemented in any method or technology for storage of information, such as computer-readable instructions, data structures, program modules, or other data. Computer storage media includes, but is not limited to, phase change memory (PRAM), static random-access memory (SRAM), dynamic random-access memory (DRAM), other types of random access memory (RAM), read only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium that can be used to store information for access by a device.

In contrast, communication media includes computer-readable instructions, data structures, program modules, or other data in a modulated data signal, such as a carrier wave. As defined herein, computer storage media does not include communication media.

The memory 206 may include an operating system that is configured to manage hardware and services within and coupled to a device for the benefit of other modules, components and devices. In some instances, at least part of the network update service 102 may be implemented within, or by, the operating system.

The network update service 102 includes one or more of a graph generating module 208 and a scheduling module 210. As used herein, the term "module" is intended to represent example divisions of the software for purposes of discussion, and is not intended to represent any type of requirement or required method, manner or organization. Accordingly, while various "modules" are discussed, their functionality and/or similar functionality could be arranged differently (e.g., combined into a fewer number of modules, broken into a larger number of modules, etc.). Further, while certain functions and modules are described herein as being implemented by software and/or firmware executable on one or more processors across one or more devices, in other embodiments, any or all of the modules may be implemented in whole or in part by hardware (e.g., as an ASIC, a specialized processing unit, etc.) to execute the described functions. In other instances, the functions and/or modules are implemented as part of a device driver, firmware, and so on.

The graph generating module 208 is configured to determine and/or receive the changes 110 that move a state of the network 104 from the observed network state 112 to the target network state 114. For example, the changes 110 may be associated with calculated differences and a calculated difference may include instruction or commands that change a state variable value from an observed value to a desired value may (e.g., a device-specific instruction or command). As discussed above, the change may be a direct change or an indirect change and a specific update operation may be associated with an operation node in the update dependency graph 118. Therefore, the graph generating module 108 generates and maintains the update dependency graph 118 based on the changes 110 and stores the updating dependency graph 118 in an update dependency graph store 212. Moreover, the graph generating module 208 generates the update dependency graph 118 based on defined constraints 120 stored in a constraints store 214. As discussed above, the constraints 120 may be defined by one or more of an entity operating the network update service 102, an entity being served by the network 104 (e.g., if different than the entity operating the network update service 102), or a developer of one of the applications 116(1) . . . 116(N).

The scheduling module 210 is configured to receive the feedback 122 from the network and dynamically, e.g., based on run-time conditions, schedule 124 one or more subsequent or next update operations via the state dependency graph 118. In various embodiments, the scheduling module 210 may use any one of a variety of scheduling algorithms to dynamically schedule the update operations. The use of a scheduling algorithm may depend on resources allocated to the network update service 102 to implement the network update. In one implementation, the scheduling module 210 may implement a critical path scheduling algorithm to implement a network update. In accordance with the critical path scheduling algorithm, the scheduling module 210 is configured to calculate path lengths (e.g., a length of an ordering) and identify a longest critical path. The scheduling module 210 is then configured to prioritize the scheduling of update operations associated with nodes that are part of a longest critical path so that an overall amount of time to implement the network update is minimized. That is, the scheduling module 210 may continually work to shorten the longest critical path by dynamically scheduling update operations associated with nodes on the longest critical path. An example critical-path scheduling algorithm is provided later in this document. Moreover, other scheduling algorithms may also be used to dynamically schedule the network update using the update dependency graph.

Upon successful completion of an update operation associated with an operation node in the update dependency graph, the scheduling module 210 may be configured to remove the operation node from the update dependency graph at least because it no longer is associated with an update operation to be implemented.

In various embodiments, a device 202 includes one or more communication unit(s) 216. The communication unit(s) 216 may be configured to facilitate a wired and/or wireless connection to one or more networks (e.g., network 104), applications 116(1) . . . 116(N) operated by various service or content providers, and/or other devices. Therefore, the communication unit(s) 216 may implement one or more of various communications or network connection protocols.

Figure 3:
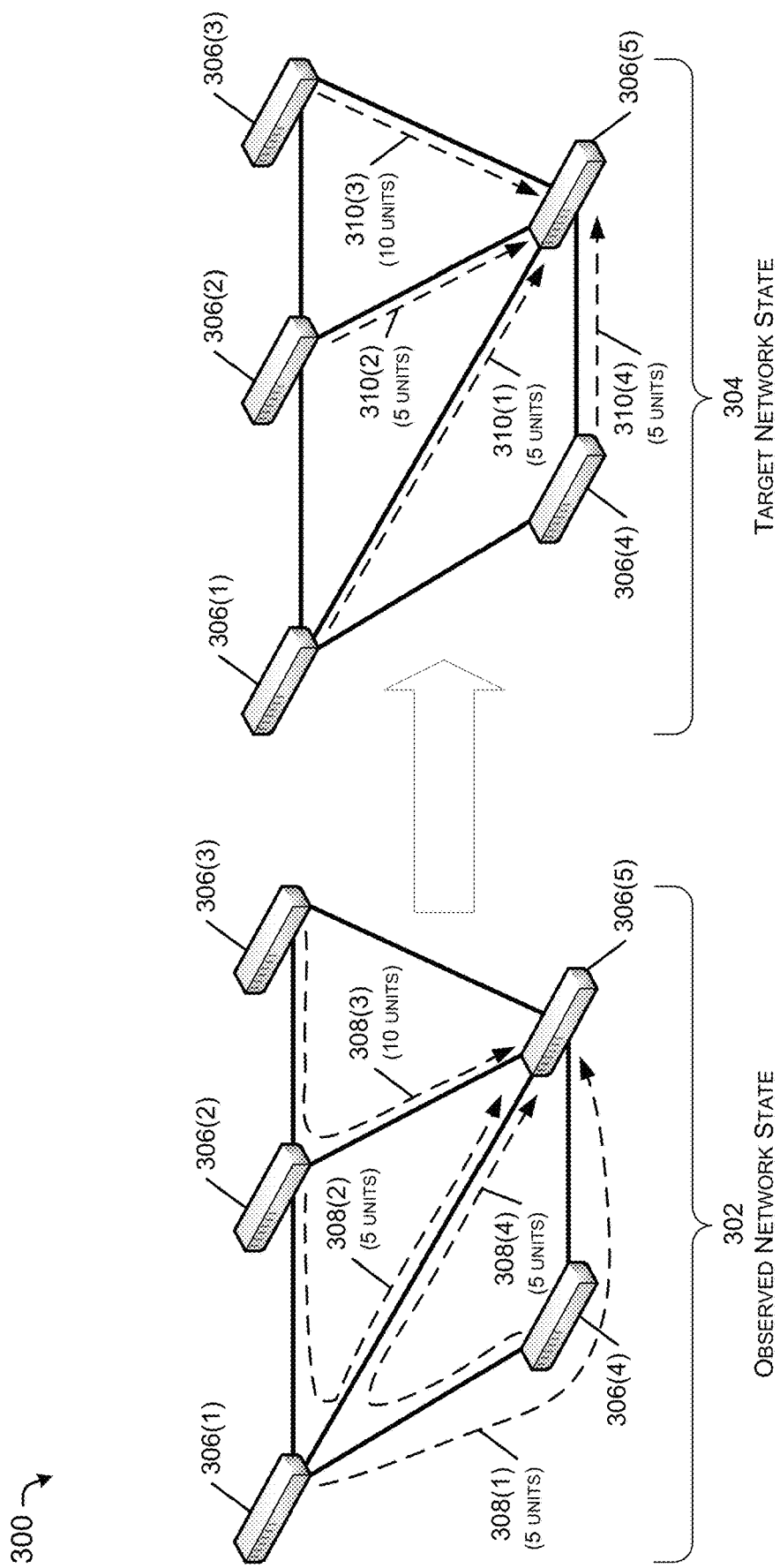
FIG. 3 illustrates an example diagram showing changes made to transition at least part of a network from an observed network state to a target network state, in accordance with various embodiments.

FIG. 3 is a diagram 300 illustrating changes to be made to transition at least part of a network from an observed network state 302 to a target network state 304. The diagram 300 shows data traffic flows between devices 306(1) . . . 306(5) (e.g., a set of network switching devices that comprise part of a network in this example). In this example, a resource constraint is defined to limit a communication or traffic load of each direct link between two devices to a maximum or threshold capacity (e.g., ten units in this example). An example unit for a communication or traffic flow may be Gbps (gigabits per second). Thus, the graph generating module 208 is configured to generate an update dependency graph so that the changes can be made in one of various orders without violating a defined constraint. In the example of FIG. 3, communication tunnels have already been established, and therefore, moving a traffic flow from a first communication path to a second communication path can be implemented by updating an ingress switching device (e.g., a state variable of the ingress switching device).

In the observed network state 302, a first traffic flow 308(1) shows five units representing observed traffic flow from device 306(1) to device 306(5) via device 306(4). A second traffic flow 308(2) shows five units representing observed flow from device 306(2) to device 306(5) via device 306(1). A third traffic flow 308(3) shows ten units (e.g., the maximum allowed capacity) representing observed flow from device 306(3) to device 306(5) via device 306(2). A fourth traffic flow 308(4) shows five units representing observed flow from device 306(4) to device 306(5) via device 306(1).

In the target network state 304, the first traffic flow 308(1) of the observed network state 302 has been moved to a target first traffic flow 310(1) that shows five units flowing from device 306(1) directly to device 306(5). The second traffic flow 308(2) of the observed network state 302 has been moved to a target second traffic flow 310(2) that shows five units flowing from device 306(2) directly to device 306(5). The third traffic flow 308(3) of the observed network state 302 has been moved to a target third traffic flow 310(3) that shows ten units flowing from device 306(3) directly to device 306(5). And the fourth traffic flow 308(4) of the observed network state 302 has been moved to a target fourth traffic flow 310(4) that shows five units flowing from device 306(4) directly to device 306(5).

Since the various switching devices 306(1) . . . 306(5) in FIG. 3 are likely to apply the traffic flow updates at different times, a one shot approach that simultaneously issues all the update operations/commands to the various switching devices 306(1) . . . 306(5) at the same time is likely to cause congestion on at least some direct links (e.g., exceed the ten unit capacity). For example, if device 306(1) successfully completes the update operation that moves flow 308(1) to target flow 310(1) before device 306(2) successfully completes the update operation that moves flow 308(2) to target flow 310(2) and before device 306(4) successfully completes the update operation that moves flow 308(4) to target flow 310(4), then the load or bandwidth demand on the direct link between device 306(1) and 306(5) will be fifteen units and will exceed the ten unit maximum capacity defined by a resource constraint. This causes congestion within the network.

Figure 4:
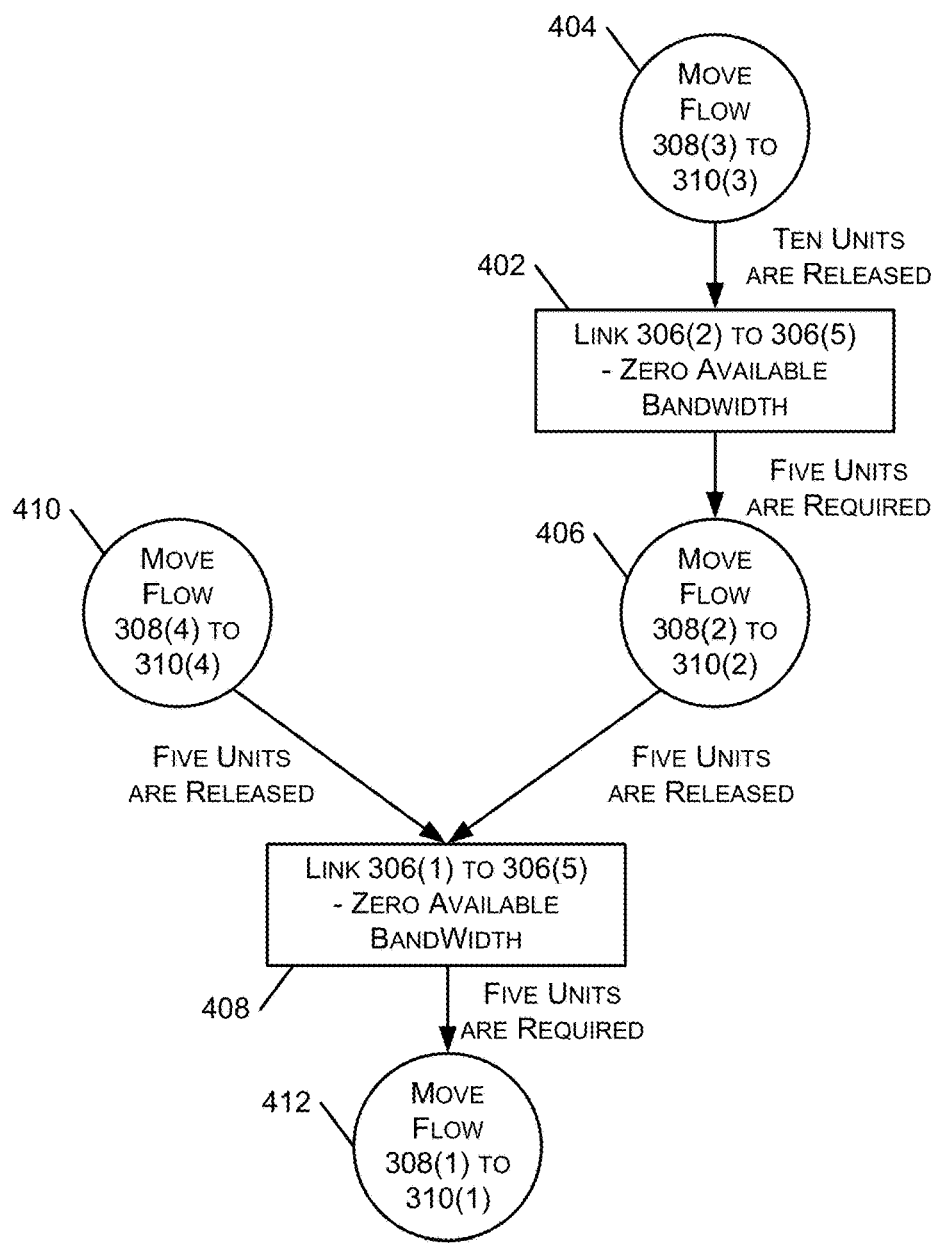
FIG. 4 illustrates an example diagram showing an update dependency graph generated based on the changes of FIG. 3, in accordance with various embodiments.

To ensure that the maximum capacity of a link (e.g., ten units in the example of FIG. 3) is not exceeded when implementing the changes in FIG. 3, the graph generating module 208 is configured to generate the example update dependency graph 400 of FIG. 4.

The circle nodes in the update dependency graph 400 of FIG. 4 represent operation nodes. The rectangle nodes in the update dependency graph 400 of FIG. 4 represent resource nodes that indicate available resources (e.g., available link bandwidth). A label on an edge that starts at an operation node and ends at, or leads to, a resource node indicates the amount of resource that is freed or released after an update operation associated with the operation node at which the edge starts is successfully completed. A label on an edge that starts at a resource node and ends at, or leads to, an operation node indicates the amount of available resources required to perform the update operation associated with the operation node at which the edge ends (e.g., resources consumed by the update operation).

Accordingly, in the observed network state 302 of FIG. 3, the link between device 306(2) and device 306(5) has "zero" available bandwidth, as indicated via resource node 402 of the example update dependency graph 400. Moving the observed traffic flow 308(3) to the target traffic flow 310(3), as indicated via operation node 404, releases ten units to the link between device 306(2) and device 306(5) and the edge from operation node 404 to resource node 402 is labeled to indicate the released resources (e.g., ten units). Furthermore, operation node 406 indicates that the observed traffic flow 308(2) is to be moved to the target flow 310(2) subsequent to moving the observed traffic flow 308(3) to the target traffic flow 310(3). The edge from resource node 402 to operation node 406 is labeled to indicate that five units are required to implement the update operation of operation node 406 (e.g., five available units between device 306(2) and device 306(5) are needed).

Moving on, resource node 408 indicates that the link between device 306(1) and device 306(5) has "zero" available bandwidth in the observed state. Moving the observed traffic flow 308(2) to the target traffic flow 310(2), as indicated via operation node 406, releases five units to the link between device 306(1) and device 306(5) and the edge from operation node 406 to resource node 408 is labeled to indicate the released resources. Furthermore, moving the observed traffic flow 308(4) to the target traffic flow 310(4), as indicated via operation node 410, also releases five units to the link between device 306(1) and device 306(5) and the edge from operation node 410 to resource node 408 is labeled to indicate the released resources.

Furthermore, operation node 412 indicates that the observed traffic flow 308(1) is to be moved to the target flow 310(1) after either an update operation associated with one of operations nodes 410 or 406 is successfully completed. The edge from resource node 408 to operation node 412 is labeled to indicate that five units are required to implement the operation of operation node 412 (e.g., five available units between device 306(1) and device 306(5) are needed).

Given the update dependency graph 400 in FIG. 4, the scheduling module 210 can dynamically schedule the update operations while also ensuring that link congestion is avoided. For instance, the schedule module 210 may determine that moving observed traffic flow 308(3) to target traffic flow 310(3) and moving observed traffic flow 308(4) to target traffic flow 310(4) do not depend on other update operations. Thus, the update operations represented by operation nodes 404 and 410 can be scheduled immediately and/or in parallel without violating a network congestion property. After the operation associated with operation node 404 is completed, the scheduling module 210 can schedule the operation associated with operation node 406. Finally, the scheduling module 210 can dynamically schedule the update operation associated with operation node 412 after determining, e.g., based on feedback, that either one of the update operation associated with node 406 or the update operation associated with node 410 is successfully completed.

As seen in the example described with respect to FIG. 3 and FIG. 4, the scheduling module 210 can use an update dependency graph to dynamically schedule update operations based on feedback received from the network and in any one of various orders. For example, the scheduling module 210 may determine that the update operation associated with operation node 410 is a straggler update operation that is stalled or delayed, and thus, the scheduling module 210 is aware that the update operation associated with operation node 412 can alternatively be implemented after the update operation associated with operation node 406 is successfully completed (e.g., because enough resources are released to satisfy the resources needed). Accordingly, the operation node 412 (e.g., a child node) may be implemented after a first ordering of update operations (e.g., parent operation nodes 404 and 406) is successfully completed or after a second ordering of update operation(s) (e.g., parent operation node 410) is successfully completed.

In the "static ordering" conventional approach discussed above, operation node 412 may have been a subsequent step in a fixed schedule that had to wait until the update operation associated with operation node 410 is completed. For example, the fixed schedule that cannot be changed after the network update begins may have required that: the observed flow 308(3) is moved to target flow 310(3) first, the observed flow 308(2) is moved to target flow 310(2) second, the observed flow 308(4) is moved to target flow 310(4) third, and only then can the observed flow 308(1) be moved to target flow 310(1).

Therefore, the update dependency graph provides scheduling flexibility such that the scheduling module 210 can still move observed flow 308(1) to target flow 310(1) even if there is a failure or delay associated with one of operation nodes 406 or 410. In some instances, to improve network update efficiency, the scheduling module 210 may dynamically schedule operation node 412 in response to determining that one of operation nodes 406 and 410 is completed faster than expected.

The example update dependency graph 400 is provided herein as an example only, and it is understood that update dependency graphs may include many more nodes and dependencies based on (i) a number of changes to be made to move a state of a network from an observed state to a target state and/or (ii) a number of constraints defined.

Figure 5:
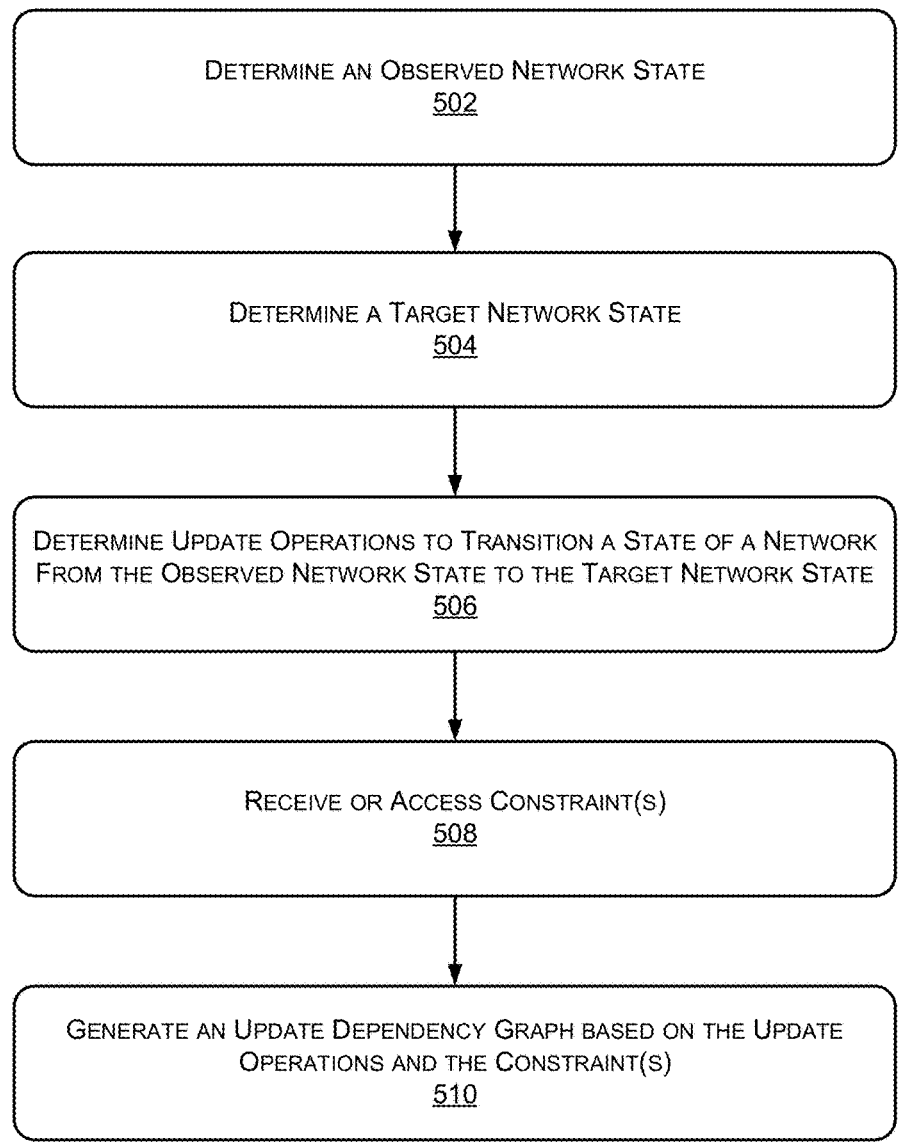
FIG. 5 illustrates an example process that generates an update dependency graph to transition a state of a network from an observed network state to a target network state, in accordance with various embodiments.
Figure 6:
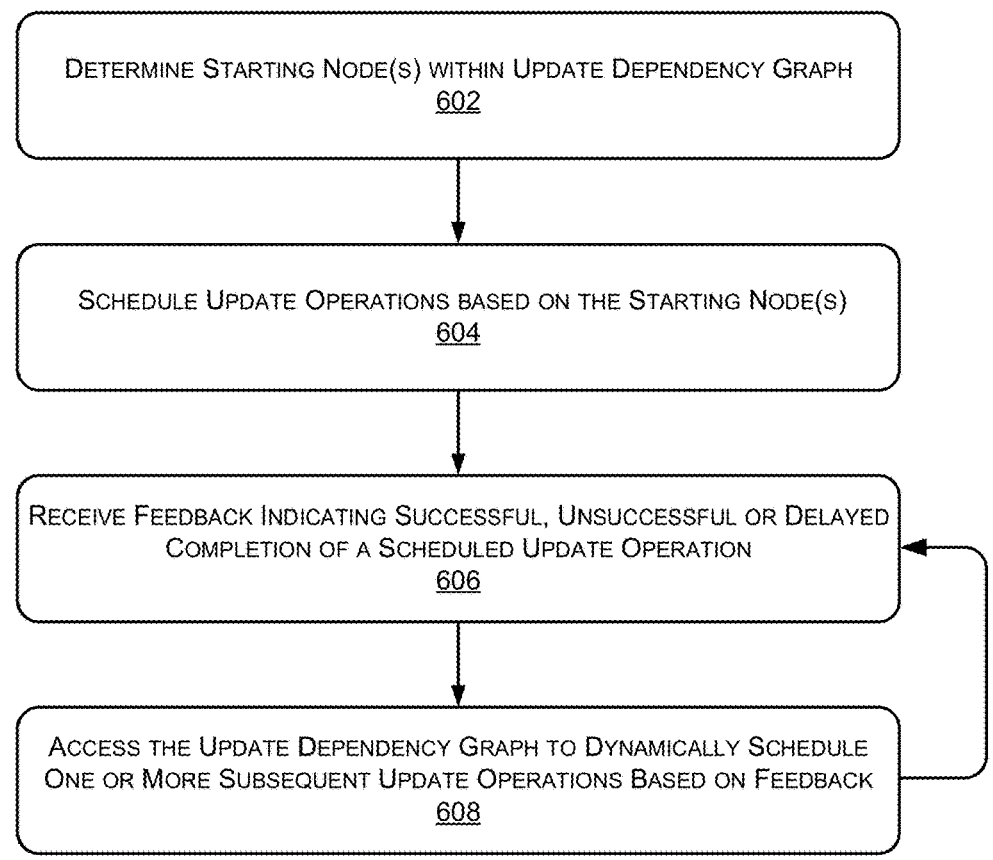
FIG. 6 illustrates an example process that uses an update dependency graph to dynamically schedule individual update operations that comprise a network update, in accordance with various embodiments.
Figure 10:
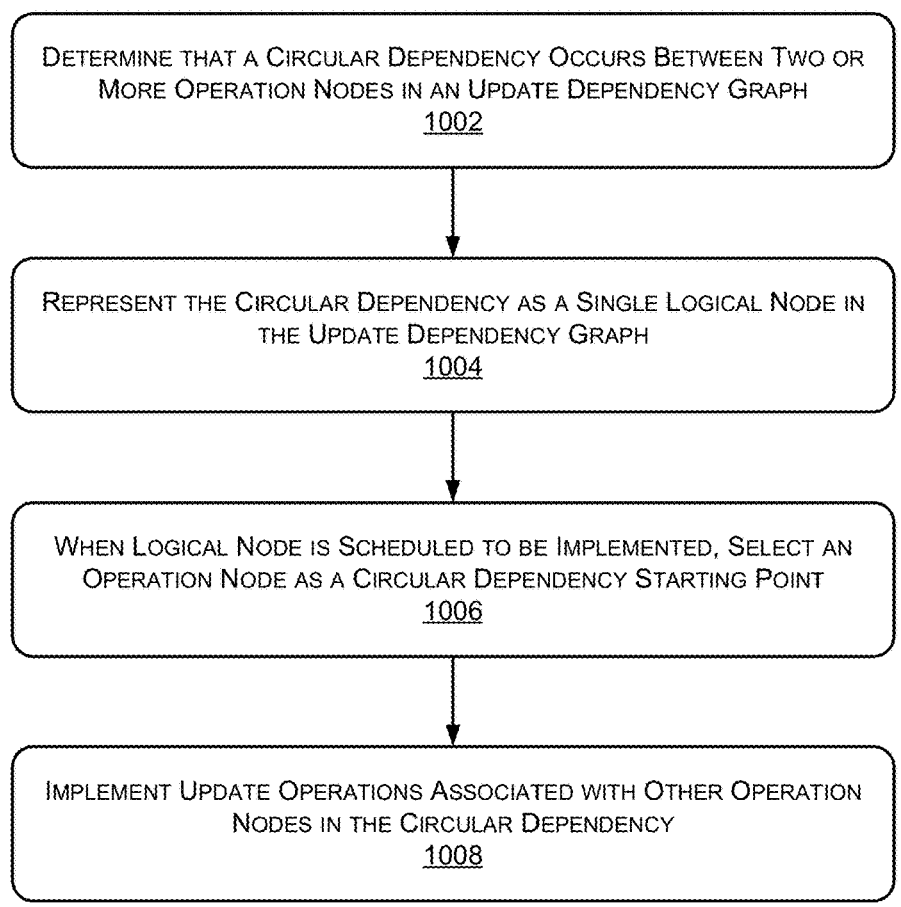
FIG. 10 illustrates an example process that schedules operation updates of a circular dependency in an update dependency graph, in accordance with various embodiments.

FIGS. 5, 6 and 10 illustrate example processes individually depicted as a logical flow graph, which represents a sequence of operations that can be implemented in hardware, software, firmware, or a combination thereof. In the context of software, the operations represent computer-executable instructions that, when executed by one or more processors, configure a computing device to perform the recited operations. Generally, computer-executable instructions include routines, programs, objects, components, data structures, and the like that configure a computing device to perform particular functions or implement particular abstract data types. In some embodiments, any or all of the operations may be implemented in whole or in part by hardware (e.g., as an ASIC, a specialized processing unit, etc.) to execute the described functions. In some instances, the functions and/or modules are implemented as part of an operating system. In other instances, the functions and/or modules are implemented as part of a device driver, firmware, and so on.

The order in which the operations are described in an example process is not intended to be construed as a limitation, and any number of the described operations can be combined in any order and/or in parallel to implement an example process.

FIG. 5 illustrates an example process 500 that determines changes to transition a state of a network from an observed network state to a target network state. The example operations in FIG. 5 may be described with reference to the modules, components and/or elements illustrated in any one of FIGS. 1-4.

At 502, the graph generating module 208 may determine an observed network state. For example, the observed network state may include one or more observed state variable values of a network (e.g., network 104). The observed network state may be stored and/or updated over time (e.g., in accordance with a periodic observing schedule). Accordingly, the graph generating module 208 may access a data store to determine the observed network state or the graph generating module 208 may receive the observed network state e.g., from a network observing service or network observing entity.

At 504, the graph generating module 208 may determine a target network state. For example, the target network state may comprise, or be generated based on, one or more changes to the observed network state. For example, applications (e.g., applications 116(1) . . . 116(N)) tasked with managing a particular network function, may request or propose changes to one or more state variable values. The changes may indicate a desire to transition (e.g., move) a state variable value from an observed value to a target value (e.g., directly or indirectly). The target network state may be stored and/or updated over time (e.g., in accordance with a periodic or continuous network updating schedule). Accordingly, the graph generating module 208 may access a data store to determine the target network state or the graph generating module 208 may receive the target network state, e.g., from a service or entity that generates the target network state.

At 506, the graph generating module 208 may determine update operations (e.g., a set of update operations) to transition a state of the network from the observed network state to the target network state. The update operations may be associated with the changes proposed or requested by the applications 116(1) . . . 116(N), for example. The update operations may comprise update instructions and/or commands to be issued to a device in the network to change one or more state variable values from an observed value to a target value.

At 508, the graph generating module 208 may receive or access one or more constraints. As discussed above, the constraints may be defined to ensure reliability of the network. For example, the constraints may be defined to ensure that a network state transition complies with one or more consistency properties, as discussed above.

At 510, the graph generating module 208 may generate an update dependency graph based on the update operations and the constraints. The update dependency graph may define various acceptable orderings in which the update operations can be dynamically scheduled. The orderings ensure that defined constraints are not violated, and therefore, the network state transition is reliable and safe. Moreover, since various orderings may be defined, the network state transition may be more efficient because if a first ordering stalls (e.g., a straggler device or a straggler operation is encountered along the first ordering), then the update dependency graph provides a second ordering in which the network state transition can continue.

The example process 500 may continually be implemented as part of an on-going network management and maintenance service. Thus, the observed network state and/or the target network state may continue to change, and therefore, the update dependency graph is generated and/or maintained to reflect updated changes that transition a state of the network from the observed network state to the target network state.

FIG. 6 illustrates an example process 600 that uses an update dependency graph to dynamically schedule individual update operations that comprise a network update. The example operations in FIG. 6 may be described with reference to the modules, components, elements and/or operations illustrated in any one of FIGS. 1-5.

At 602, the scheduling module 210 may determine one or more starting nodes within an update dependency graph. The starting nodes are associated with update operations that may be scheduled first, to implement a network update. In various embodiments, the starting nodes may be determined based on critical path scheduling in which a longest path through the update dependency graph is determined.

At 604, the scheduling module 210 begins scheduling update operations based on the starting nodes. For example, the scheduling module 210 may begin scheduling update operations in accordance with one or more orderings.

At 606, the scheduling module 210 receives feedback indicating successful, unsuccessful (e.g., failed) or delayed completion of a previously scheduled update operation (e.g., an update operation associated with a starting node).

At 608, the scheduling module 210 may access the update dependency graph to dynamically schedule one or more subsequent update operations based on the feedback. For example, if the feedback indicates that the previously scheduled update operation has failed or is delayed, then the scheduling module 210 may use the update dependency graph to select for scheduling an update operation that does not depend on successful completion of the failed or delayed update operation. The previously scheduled update operation may be part of a first ordering in the update dependency graph and the selected update operation may be part of a second ordering in the update dependency graph. The scheduling module 210 continues to iteratively perform operations 606 and 608. For example, the scheduling module 210 continues to iteratively perform operations 606 and 608 until a transition from an observed network state to a target network state is completed.

The discussion provided below describes implementations where the network update service 102 transitions the network from an observed network state to a target network state in association with tunnel-based forwarding and/or weighted cost multi-path (WCMP) forwarding.

For purposes of the discussion provided herein, a network G (e.g., at least a portion of network 104), may comprise a set of switching devices, S, and a set of direct links, L, where a direct link connects two switching devices. A flow f represents data communicated, e.g., via an established tunnel, from an ingress switching device, $s_i$, to an egress switching device, $s_j$, with traffic volume $t_f$. The network may use a path set $P_f$ to carry traffic (e.g., may also be referred to as a tunnel set). Thus, the forwarding state of f may be defined as $R_f = \{r_{f,p} | p \in P_f\}$ where $r_{f,p}$ is the traffic load of f on path p. The network state NS can then be represented as the combined state of all flows such that NS=$\{R_f | f \in F\}$. Relative weights may be set at an ingress switching device to determine how the flow is split, or divided, amongst multiple paths or tunnels.

Figure 7:
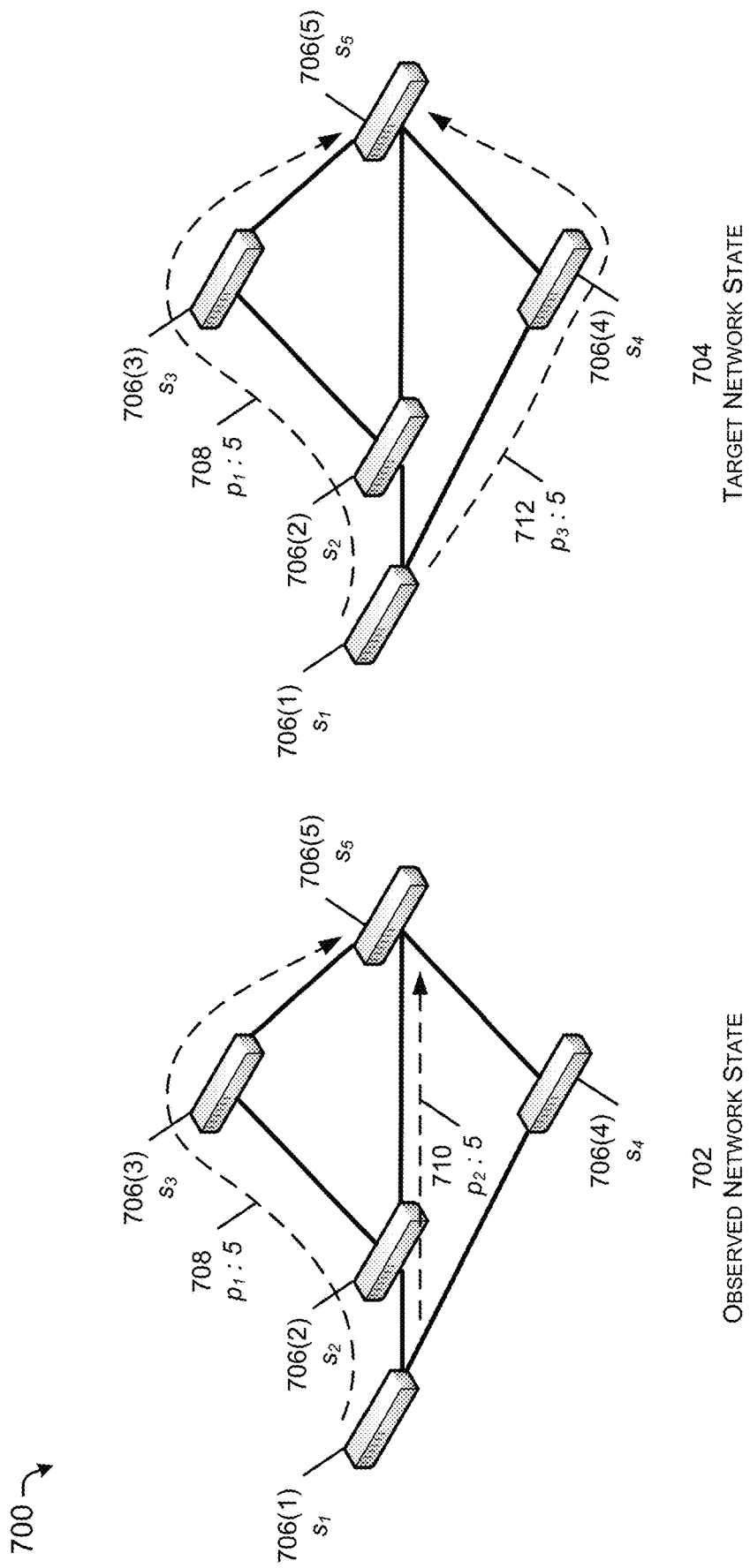
FIG. 7 illustrates an example diagram showing a state transition from an observed network state to a target network state for a portion of a network that forwards traffic, in accordance with various embodiments.

As an illustrative example, FIG. 7 shows at least part of a network 700, e.g., configured to communicate data units (e.g., data packets, Gbps, etc.), that transitions from an observed network state 702 to a target network state 704. The network 700 includes five switching devices, 706(1) . . . 706(5), (e.g., these may also be referred to herein as individual switching devices $s_1$, $s_2$, $s_3$, $s_4$, $s_5$). The observed network state 702 has a flow (a flow is represented by a dashed line) across a first path, $p_1$, 708, and a second path, $p_2$, 710, with five data units of traffic flowing along each of the first path, $p_1$, 708 and the second path, $p_2$, 710 (e.g., shown a "5" in FIG. 7). In the example of FIG. 7, it follows that the traffic volume $t_f$=10, the path set $P_f = \{p_1 = s_1 s_2 s_3 s_5, p_2 = s_1 s_2 s_5\}$, and the forwarding state for f is $R_f = \{r_{f,p1} = 5, r_{f,p2} = 5\}$. FIG. 7 also illustrates that the target network state 704 of the network 700 has a flow across a same first path, $p_1$, 708 and a new third path, $p_3$, 712. The target network state 704 does not include the old second path, $p_2$, 710 from the observed network state 702.

The network update service 102 may use the representations in the preceding paragraph in association with tunnel-based forwarding that may be used in Wide-Area Networks (WANs), for example. The network update service 102 may also use the representations in the preceding paragraph in association with WCMP forwarding that may be used in data center networks (DCNs), for example.

In tunnel-based forwarding, a flow may be forwarded by multiple paths. The ingress switching device (e.g., switching device 706(1)/$s_1$ in FIG. 7) may (i) match incoming traffic to the flow, e.g., based on data packet headers, and (ii) split the incoming traffic across the multiple paths based on weights. Before forwarding a data packet along a path, the ingress switching device may tag the data packet with a path identifier. Subsequent switching devices (e.g., switching devices 706(2)/$s_2$ and 706(3)/$s_3$ along the first path, $p_1$, 708)

may forward the data packets based on the path identifier and an egress switching device (e.g., switching device 706(5)/$s_5$ in FIG. 7) may remove the path identifier after the data packet arrives. Thus, for tunnel-based forwarding $P_f$ is the set of paths (or tunnels) and the weight of a path is $r_{f,p}/t_f$ (e.g., five divided by ten in FIG. 7 or 50% weight for each of the first path, $p_1$, 708 and the second path, $p_2$, 710).

In WCMP forwarding, switching devices at every hop along a path may match packet headers and split flows over one or more next hops with set weights. Shortest-path and equal cost multi-path (ECMP) forwarding are example types of WCMP forwarding. For WCMP forwarding, the network update service 102 may calculate a traffic rate of the flow on link l using Equation (1) as follows:

$$r_f^l = \Sigma_{l \in p, p \in P_f} r_{f,p} \qquad \text{equ. (1)}$$

Then at switch $s_i$, the weight for a next hop $s_j$ may be determined using Equation (2) as follows:

$$w_{i,j} = r_f^{l_{ij}} / \Sigma_{l \in L_i} r_f^l \qquad \text{equ. (2)}$$

Here $l_{ij}$ is the link from $s_i$ to $s_j$ and $L_i$ is the set of links starting at $s_i$. For example, in the observed network state 702 of FIG. 7, $w_{1,2}=1$, $w_{1,4}=0$, $w_{2,3}=0.5$, and $w_{2,5}=0.5$.

As discussed above, the network update service 102 may be configured to receive, as an input, a current (e.g., observed) network state, $NS_c$, a target network state, $NS_t$, and one or more constraints associated with one or more consistency properties. The network update service 102 can then determine (e.g., compute) a set of update operations (e.g., based on changes 110) that transition a state of the network from the current network state $NS_c$ (e.g., 702 in FIG. 7) to the target state $NS_t$ (e.g., 704 in FIG. 7) and inter-link the update operations to build an update dependency graph so that the constraints are not violated when a network update is implemented. Therefore, the state transition is reliable and safe.

For these example data forwarding implementations, in addition to operation nodes and resource nodes, the graph generating module 208 may be configured to include path nodes in an update dependency graph. A path node may further organize an update dependency graph by grouping update operations and/or link capacity resources that are associated with an individual path. A path node can connect to operation nodes and/or resource nodes. An edge from an operation node to a path node can be an operation dependency or a resource dependency. As part of the scheduling process, a path node that releases link resources may have an associated "committed" label that indicates an amount of traffic that is moving away from the path as a network transitions from the observed network state to the target network state. After the traffic is moved away, the committed label may be used to update an amount of available resources.

Figure 8:
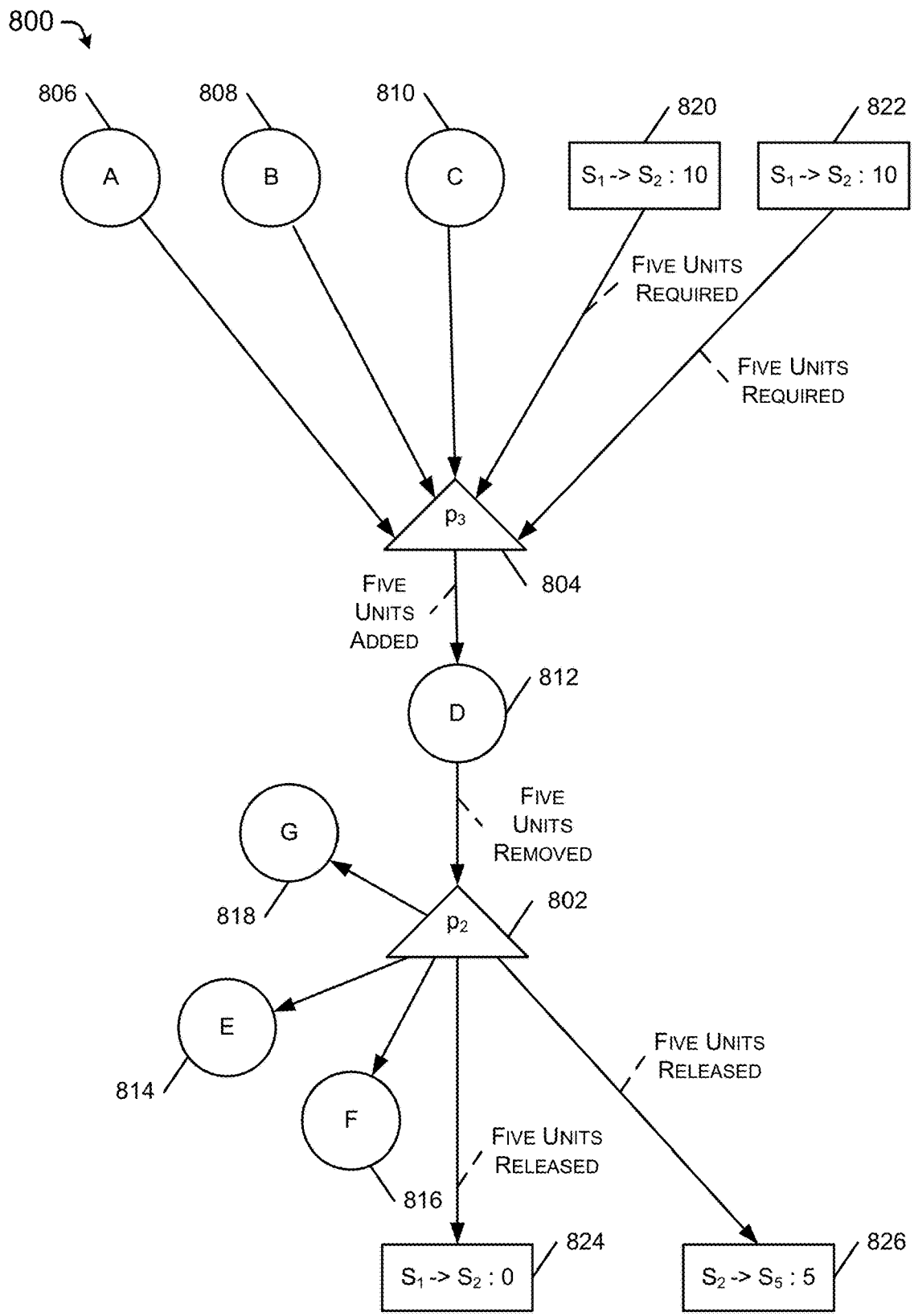
FIG. 8 illustrates an example diagram showing an update dependency graph generated based on the state transition of FIG. 7, in accordance with various embodiments.

FIG. 8 illustrates an example update dependency graph 800 generated for tunnel-based forwarding based on the state transition shown in FIG. 7. The graph generating module 208 may generate the update dependency graph 800 based on constraints defined to ensure black hole freedom for a network. In various embodiments, the constraints may indicate that (i) a new path is to be fully established before an ingress switching device applies traffic to the new path, and (ii) all traffic is removed from a path to be deleted before the path is removed from any downstream switching device.

The graph generating module 208 may generate the update dependency graph 800 based on the constraints specified in the preceding paragraph as follows. For each flow f, using $NS_c$ and $NS_t$, the graph generating module 208 may determine paths to be added and/or to be deleted and may generate a path node for each added and/or deleted path. Then, the graph generating module 208 may generate an operation node for individual hops and add an edge from (i) an operation node to the path node or (ii) from the path node to an operation node, thereby indicating that a path is added or deleted at a switching device. The graph generating module 208 may generate an operation node that changes the path weights so that the weights correspond to those specified in the $NS_t$ at the ingress switching device. To ensure black hole freedom, the graph generating module 208 may add an edge from each path node that adds a new tunnel to the operation node that changes the path weights. Further, the graph generating module 208 may add an edge from the operation node that changes the path weights to each path node that deletes an old path.

As discussed above with respect to FIG. 7, the path weights on the first path, $p_1$, 708 and the second path, $p_2$, 710 of the observed network state 702 are 0.5 and 0.5 respectively. In the target network state 704, a path is added (e.g., the third path, $p_3$, 712) and a path is deleted (e.g., the second path, $p_2$, 710) and the path weights are changed to 0.5 on the first path, $p_1$, 708 and 0.5 on the third path, $p_3$, 712.

To generate the update dependency graph 800 for this transition, the graph generating module 208 may generate a path node 802, e.g., triangle node corresponding to the second path, $p_2$, 710, which is a path to be deleted via the state transition of FIG. 7. The graph generating module 208 may also generate a path node 804, e.g., triangle node corresponding to the third path, $p_3$, 712, which is a path to be added via the state transition of FIG. 7. The graph generating module 208 may further generate: operation node 806 associated with operation A specified in Table 1 below, operation node 808 associated with operation B specified in Table 1 below, operation node 810 associated with operation C specified in Table 1 below, operation node 812 associated with operation D specified in Table 1 below, operation node 814 associated with operation E specified in Table 1 below, operation node 816 associated with operation F specified in Table 1 below, and operation node 818 associated with operation G specified in Table 1 below.

TABLE 1

| INDEX | OPERATION |
| --- | --- |
| A | Add $p_3$ at $s_1$ |
| B | Add $p_3$ at $s_4$ |
| C | Add $p_3$ at $s_5$ |
| D | Change weight at $s_1$ |
| E | Delete $p_2$ at $s_1$ |
| F | Delete $p_2$ at $s_2$ |
| G | Delete $p_2$ at $s_5$ |

As seen in Table 1, the graph generating module 208 generates the update dependency graph 800 so that a new path $p_3$ (e.g., path node 804) is fully established after operations A, B, and C associated with operation nodes 806, 808, and 810 are successfully completed. The update dependency graph 800 then indicates that the path weights at $s_1$ (e.g., switching device 706(1)) can be switched (e.g., via operation D corresponding to node 812) so the traffic is removed before deleting the old path $p_2$ (e.g., via operations E, F, and G associated with operation nodes 814, 816, and 818, respectively). As shown in the update dependency graph 800, the graph generating module 208 defines dependencies by adding: (i) edges from the operation nodes 806, 808, and 810 that add a path to the corresponding path node 804, and (ii) edges to the operation nodes 814, 816, and 818 that delete a path from the corresponding path node 802. The graph generating module 208 also defines a dependency by adding an edge from the path node 804 to the weight-changing operation node 812 and from the weight-changing operation node 812 to the path node 802.

In addition to the constraints discussed above with respect to tunnel-based forwarding, resource constraints may also be defined (e.g., a maximum link capacity, a maximum memory capacity of a switching device, etc.). In various embodiments, the resource constraints may cause the update dependency graph 800 in FIG. 8 to have resource nodes (e.g., rectangle nodes). The resource nodes in FIG. 8 are labeled to indicate a current amount of available resources.

For example, resource node 820 indicates that the link between $s_1$ and $s_4$ in the observed network state 702 of FIG. 7 has ten available (e.g., free) units. Similarly, resource node 822 indicates that the link between $s_4$ and $s_5$ in the observed network state 702 of FIG. 7 has ten available (e.g., free) units. The edge from resource node 820 to path node 804 is labeled to indicate that five units are required to add the third path $p_3$ 712. The edge from resource node 822 to path node 804 is also labeled to indicate that five units are required to add the third path $p_3$ 712.

Furthermore, the edge from path node 802 to resource node 824 and resource node 826 are labeled to indicate, upon the deletion of path $p_2$, that five units are released to (i) the link between $s_1$ and $s_2$ (which has zero availability in the observed network state as indicated via resource node 824) and (ii) the link between $s_2$ and $s_5$ (which has five units available in the observed network state as indicated via resource node 826). As discussed above, the indications may be referred to as a committed label indicating an amount of traffic moving away from the path.

The graph generating module 208 furthers adds a label on the edge from path node 804 to operation node 812 (e.g., operation D which changes path weights at $s_1$) to indicate that five units of traffic are added via path node 804. Furthermore, the label on the edge from operation node 812 to path node 802 indicates that five units of traffic are removed via path node 802.

For resource nodes associated with memory of a device (e.g., a switching device), the graph generating module 208 may add an edge from a resource node to an operation node if the associated update operation consumes memory at a device and the graph generating module 208 labels the edge with a weight indicating the amount of memory consumed by the update operation. Conversely, the graph generating module 208 may add an edge from an operation node to a resource node if the associated update operation releases memory at the device and the graph generating module 208 labels the edge with a weight indicating the amount of memory released.

In WCMP forwarding, the graph generating module 208 may determine weight change operations for each flow to be updated based on the transition from the $NS_c$ to $NS_t$. The graph generating module 208 generates dependency edges between these weight change operations based on constraints associated with a packet coherence network consistency property.

Example Algorithm 1 may be used by the graph generating module 208 to generate the example update dependency graph to ensure packet coherence (e.g., in a WCMP Network). In example Algorithm 1, an old version number represents an old routing rule that may be part of the $NS_c$ and a new version number represents a new routing rule that may be part of the $NS_t$.

| ALGORITHM 1 |
|---|
| -          $v_0$: old version number |
| -          $v_1$: new version number |
| 1:     for each flow f do |
| 2:         s* = GetIngressSwitch(f) |
| 3:         o* = GenRuleModifyOp(s*, $v_1$) |
| 4:         for $s_i$ ∈ GetAllSwitches(f) − s* do |
| 5:            if $s_i$ has multiple next-hops then |
| 6:               $o_1$ = GenRuleInsertOp($s_i$, $v_1$) |
| 7:               $o_2$ = GenRuleDeleteOp($s_i$, $v_0$) |
| 8:               Add edge from $o_1$ to o* |
| 9:               Add edge from o* to $o_2$ |

Using example Algorithm 1, an ingress switching device is configured to tag each data packet with a version number and downstream switching devices handle data packets based on the version number. This ensures that each data packet either is routed according to the old routing rule or the new routing rule (i.e., the data packet is not routed based on a mix of rules). Example Algorithm 1 generates three types of operations: a first type in which an ingress switching device tags data packets with the new version number and uses new weights (Line 3 of example Algorithm 1); a second type in which downstream switching devices have rules for handling the data packets with the new version number and new weights (Line 6 of example Algorithm 1); and a third type in which downstream switching devices delete rules for the old version number (Line 7 of example Algorithm 1). Accordingly, packet coherence is ensured if the first type of operations specified above occur after the second type of operations specified above (Line 8 of example Algorithm 1) and if the third type of operations specified above occur after the first type of operations (Line 9 of example Algorithm 1). Line 5 of example Algorithm 1 is an example optimization specifying that no changes may be required at switching devices that have only one next hop for the flow in both the old and new routing rules.

After an update dependency graph is generated and/or updated to reflect update operations associated with the changes 110, the scheduling module 210 uses the update dependency graph to implement the network update (e.g., issue update instructions and/or commands for various devices to carry out the update operations). The update dependency graph may provide multiple different acceptable orderings in which to implement a network update so that the constraints are not violated, and different orderings may be associated with different completion times (e.g., an amount of time it takes to complete a set of update operations in an ordering). Therefore, in various embodiments, the scheduling module 210 is configured to identify an ordering within the update dependency graph that likely will take the longest amount of time to complete and initiate the scheduling of the identified ordering to minimize this longest amount of time. This may be referred to as critical path scheduling.

To implement critical path scheduling, the scheduling module 210 may use example Algorithm 2, provided herein:

| Algorithm 2 |
|---|
| 1:     while true do |
| 2:         UpdateGraph(G) |
| 3:         Calculate CPL for every node |
| 4:         Sort nodes by CPL in decreasing order |
| 5:         for unscheduled operation node $O_i$ ∈ G do |
| 6:            if CanScheduleOperation($O_i$) then |

-continued

Algorithm 2

7:     Schedule $O_i$
8:     Wait for time t or for all scheduled operations to finish The symbols and/or variables in example Algorithm 2 are specified as follows in Table 2:

TABLE 2

| Symbol | Description |
| --- | --- |
| $O_i$ | Operation Node i |
| $R_j$ | Resource Node j |
| $R_j$.free | Free Capacity of $R_j$ |
| $P_k$ | Path Node k |
| $P_k$.committed | Traffic that is Moving Away from Path k |
| $l_{ij}$ | Edge Weight from Node i to Node j |

Since resource nodes and/or path nodes in the update dependency graph may be used to express constraints, the scheduling module 210 assigns a weight w=0 to the resource nodes and/or path nodes when calculating critical paths. Conversely, the scheduling module 210 assigns a weight w=1 to operation nodes and calculates a critical path length $CPL_i$ for each node i in an update dependency graph shown in Equation (3) as follows:

$$CPL_i = w_i + \max_{j \in children(i)} CPL_j \quad \text{equ. (3)}$$

In various embodiments, he scheduling module 210 may implement a topological sort of the nodes in the update dependency graph and then iterate over the nodes to calculate $CPL_i$ using Equation (3) in a reverse topological order. This can be implemented efficiently in linear time.

Therefore, the scheduling of update operations may be implemented based on example Algorithm 2. For example, each time the scheduling module 210 commences scheduling, the scheduling module 210 may first update the update dependency graph by removing completed update operations and/or edges in the update dependency graph that may be associated with resources that are no longer bottlenecked (Line 2 in example Algorithm 2). Then the scheduling module 210 calculates a CPL for individual nodes (Line 3 in example Algorithm 2) and sorts the nodes in decreasing order of CPL (Line 4 in example Algorithm 2). The scheduling module 210 subsequently iterates over operation nodes and schedules the operation nodes if their operation dependencies and/or resource dependencies are satisfied (Lines 6 and 7 in example Algorithm 2). Finally, the scheduling module 210 may wait for a period of time or for the scheduled update operations to be completed before it begins a next round (Line 8 in example Algorithm 2).

In various embodiments, the scheduling module 210 implements critical path scheduling for an update dependency graphs that is a directed acyclic graph (DAG) such that it is free of circular dependencies. Example Algorithm 3 and example Algorithm 4 provided herein show pseudo code for scheduling update operations for the specific implementation of tunnel-based forwarding discussed above.

Algorithm 3 - CanScheduleOperation($O_i$)

```
// Add tunnel operation node
1:  if O_i.isAddTunnelOp( ) then
2:     if O_i.hasNoParents( ) then
3:        return true
4:     R_j ← parent(O_i) // AddTunnelOp only has 1 parent
5:     if R_j.free ≥ l_ji then
6:        R_j.free ← R_j.free - l_ji
7:        Delete edge Rj → O_i
8:        return true
9:     return false
// Delete tunnel operation node
10: if O_i.isDelTunnelOp( ) then
11:    if O_i.hasNoParents( ) then
12:       return true
13:    return false
// Change weight operation node
14: total ← 0
15: canSchedule ← false
16: for path node P_j ∈ parents(O_i) do
17:    available ← l_ji
18:    if P_j.hasOpParents( ) then
19:       available ← 0
20:    else
21:       for resource node R_k ∈ parents(P_j) do
22:          available ← min(available, l_kj, R_k.free)
23:       for resource node R_k ∈ parents(P_j) do
24:          l_kj ← l_kj - available
25:          R_k.free ← R_k.free - available
26:    total ← total + available
27:    l_ji ← l_ji - available
28: if total > 0 then
29:    canSchedule ← true
30:    for path node Pj ∈ children(O_i) do
31:       P_j.committed ← min(l_ij, total)
32:       l_ij ← l_ij - P_j.committed
33:       total ← total - P_j.committed
34: return canSchedule
```

Example Algorithm 3 determines if an update operation $O_i$ is ready to be scheduled and also updates the resource levels for resource nodes and/or path nodes accordingly. If $O_i$ is a path (e.g., tunnel) addition operation, the scheduling module 210 can schedule $O_i$ either if it has no parent nodes (Lines 2 and 3 in example Algorithm 3) or if its parent resource node indicates enough available (e.g., free) resource (Lines 4-8 in example Algorithm 3). If $O_i$ is a path deletion operation, the scheduling module 210 can schedule $O_i$ if it has no parent nodes s (Lines 11 and 12 in example Algorithm 3). In various embodiments, path deletion operations do not have resource nodes as parent nodes because they release resources (e.g., memory resources, link resources, etc.).

If $O_i$ is a weight change operation, the scheduling module 210 gathers free capacities on the paths where traffic increases and moves traffic to them (Lines 14-34 in example Algorithm 3). The scheduling module 210 then iterates over each parent path node and obtains the available resources of the path (Lines 16-27 in example Algorithm 3). This relates to the amount of traffic capable of being moved to the path. The scheduling module 210 then sums up the paths into a total amount of traffic the scheduling module 210 can move for this flow (Line 26 in example Algorithm 3). Lastly, the scheduling module 210 iterates over child path nodes (Line 30-33 in example Algorithm 3) and decreases "$P_j$.committed" traffic on path represented by $P_j$ (Line 31 in example Algorithm 3).

---
Algorithm 4 - UpdateGraph(G)
---

1: for finished operation node $O_i \in G$ do
    // Finish add tunnel operation node
2:   if $O_i$.isAddTunnelOp( ) then
3:     Delete $O_i$ and all its edges
    // Finish delete tunnel operation node
4:   else if $O_i$.isDelTunnelOp( ) then
5:     $R_j \leftarrow$ child($O_i$)
6:     $R_j$.free $\leftarrow R_j$.free $+ l_{ij}$
7:     Delete $O_i$ and all its edges // DelTunnelOp only has 1 child
    // Finish change weight operation node
8:   else
9:     for path node $P_j \in$ children($O_i$) do
10:       for resource node $R_k \in$ children($P_j$) do
11:         $l_{jk} \leftarrow l_{jk} - P_j$.committed
12:         $R_k$.free $\leftarrow R_k$.free $+ P_j$.committed
13:         if $l_{jk} = 0$ then
14:           Delete edge $P_j \rightarrow R_k$
15:       $P_j$.committed $\leftarrow 0$
16:       if $l_{ij} = 0$ then
17:         Delete $P_j$ and its edges
18:     for path node $P_j \in$ parents($O_i$) do
19:       if $l_{ji} = 0$ then
20:         Delete $P_j$ and its edges
21:     if $O_i$.hasNoParents( ) then
22:       Delete $O_i$ and its edges
23: for resource node $R_i \in G$ do
24:   if $R_i$.free $\geq \Sigma_j l_{ij}$ then
25:     $R_i$.free $\leftarrow R_i$.free $- \Sigma_j l_{ij}$
26:     Delete all edges from $R_i$ Example Algorithm 4 updates the update dependency graph before scheduling based on update operations that finished in the last round of updating the network. For instance, the scheduling module 210 receives the completed update operations and updates related nodes in the update dependency graph (Lines 1-22 in example Algorithm 4). If the operation node adds a path, the scheduling module 210 deletes the operation node and its edges (Lines 2 and 3 in example Algorithm 4). If the operation node deletes a path, then rule space is freed and the scheduling module 210 updates the resource node (Lines 5 and 6 in example Algorithm 4) and deletes the operation node (Line 7 in example Algorithm 4). If the operation node changes a weight, for each child path node, the scheduling module 210 releases resources to links (Lines 11 and 12 in example Algorithm 4) and deletes the edge if the resources are released (Lines 13 and 14 in example Algorithm 4). Then the scheduling module 210 resets the amount of traffic that is moving away from this path, $P_j$.committed, to zero (Line 15 in example Algorithm 4). Once the scheduling module 210 has moved the traffic away from this path, the scheduling module 210 deletes the path node (Lines 16 and 17 in example Algorithm 4). Similarly, the scheduling module 210 checks the parent path nodes (Lines 18-20 in example Algorithm 4). If the scheduling module 210 has moved all the traffic into a path, the scheduling module 210 deletes the path node (Lines 19 and 20 in example Algorithm 4). If the parent path nodes are removed, the weight change for this flow has finished and the scheduling module 210 removes it from the update dependency graph (Line 22 in example Algorithm 4). After updating the update dependency graph with completed update operations, the scheduling module 210 checks the resource nodes (Lines 23-26 in example Algorithm 4) and deletes edges from resources that are not bottlenecked (Line 24-26 in example Algorithm 4).

In various embodiments, an update dependency graph may include a circular dependency. For instance, due to a defined resource constraint, dependencies between a group of nodes (e.g., a group with two or more operation nodes) maybe create a circle and as a result the critical path may become infinite. Moreover, a circular dependency may cause a scheduling deadlock that halts progress of a network update.

Figure 9:
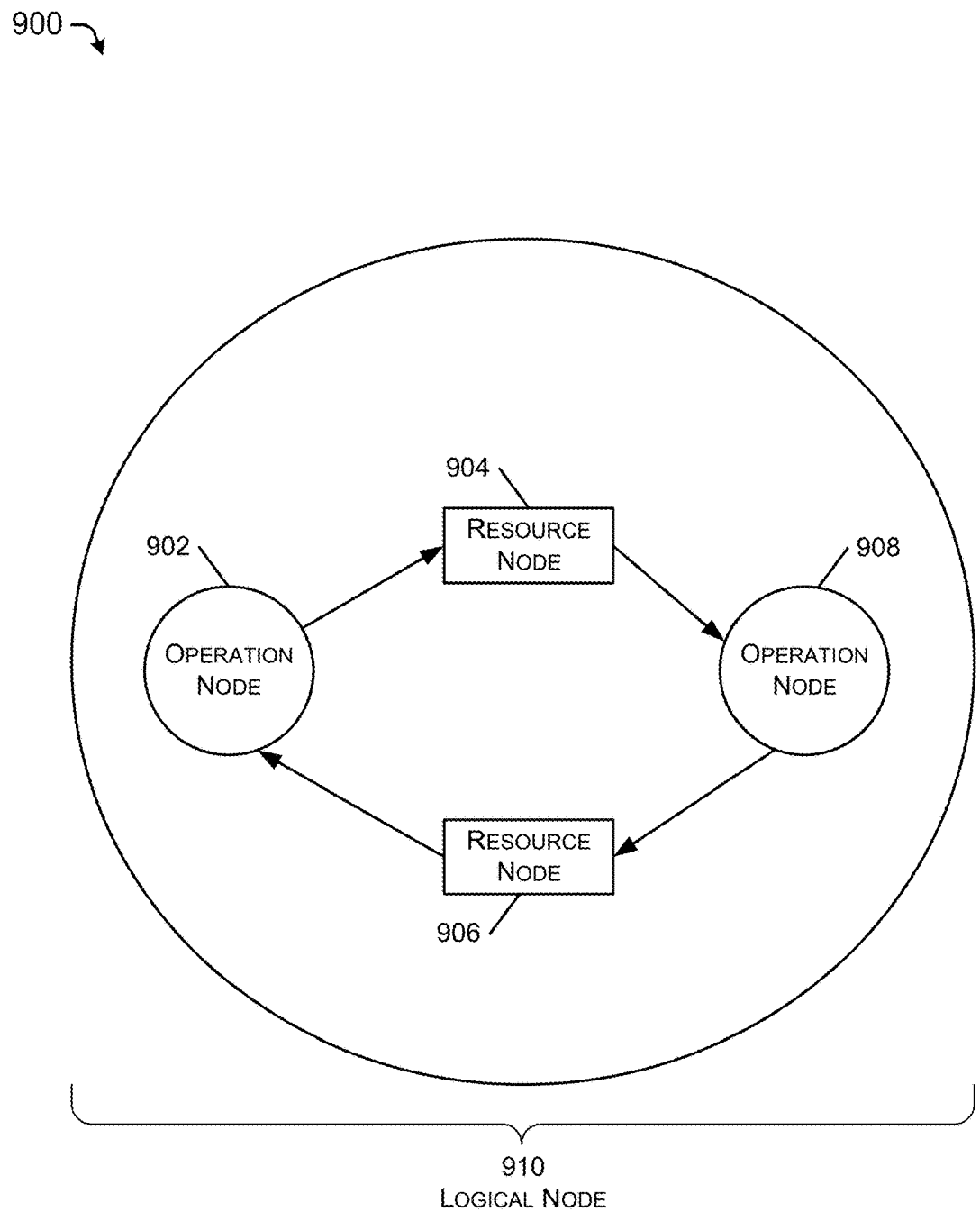
FIG. 9 illustrates an example diagram showing a circular dependency in an update dependency graph, in accordance with various embodiments.

FIG. 9 illustrates an example diagram 900 where a circular dependency may occur in an update dependency graph. That is, a first operation node 902, upon implementation, may release resources to a resource associated with a first resource node 904 but may require that a resource associated with a second resource node 906 have enough available resources before being implemented. However, an update operation associated with a second operation node 908 may require that the resource associated with the first resource node 904 have enough available resources before being implemented and the aforementioned resource may not have sufficient resource availability until the update operation associated with update operation node 902 is completed. Moreover, the resource associated with the second resource node 906 may not be able to provide available resources to operation node 902 until operation node 908 is completed. Thus, a circular dependency results.

In embodiments where an update dependency graph comprises one or more circular dependencies, the scheduling module 210 may be configured to (i) determine that a circular dependency occurs in the update dependency graph and (ii) represent the circular dependency as a single logical node 910 in the update dependency graph. Thus, the scheduling module 210 may be configured to schedule the logical node 910 as part of a DAG, e.g., using example Algorithm 2 provided above.

In some instances, the logical node 910 may be referred to as a strongly connected component (SCC) that is a sub-part of an update dependency graph where each inclusive node has a path to other nodes included in the SCC. If an SCC is represented as logical node in the update dependency graph, then the scheduling module 210 can calculate CPLs as discussed above and implement critical path scheduling. In some instances, an SCC may be associated with multiple circular dependencies. For example, two or more circular dependencies may overlap such that at least one node (e.g., an operation node) may be an intersecting node that is part of two or more circular dependencies. Therefore, the scheduling module 210 may schedule update operations for a first circular dependency and then use the intersecting node to schedule update operations for at least a second circular dependency.

In various embodiments, when calculating CPLs, the scheduling module 210 may use a number of operation nodes included in an SCC (e.g., the number is two in FIG. 9) as a weight for the corresponding logical node. Consequently, the scheduling module 210 may be configured to evaluate a weight so that orderings that include larger SCCs (e.g., more operation nodes) will be preferred.

As an example, the scheduling module 210 may implement two modifications to incorporate SCCs into DAG scheduling. First, the "for" loop at line 5 of Algorithm 2 iterates over all nodes in a virtual update dependency graph (e.g., an update dependency graph with one or more circular dependencies individually represented as a logical node). When a node is selected and if it is a single node, the scheduling module 210 may directly call CanScheduleOperation($O_i$). If the selected node is a logical node (e.g., logical node 910), the scheduling module 210 may iterate over the operation nodes in an SCC and call the functions accordingly.

In some implementations, the scheduling module 210 may use a centrality approach to decide an order of the iteration. Using the centrality approach, the scheduling module 210 identifies a central node (e.g., the intersecting node mentioned above) of an SCC that may be part of multiple circular dependencies, and the scheduling module 210 may schedule the central node early in the update process so that update operations from multiple circular dependencies can be implemented and the SCC can be scheduled and/or completed more efficiently.

The second modification implemented by the scheduling module 210 relates to when path nodes consume link resources or tunnel add operations consume switch resources. This consumption of resources can be implemented via nodes that either (i) are in the same SCC as the path nodes or tunnel add operations consuming the resources, or (ii) are independent nodes (not in any SCC). This heuristic helps prevent deadlocks caused by allocating resources to nodes outside the SCC.

Therefore, with the scheduling algorithm above (e.g., Algorithm 2), the scheduling module 210 can solve SCCs. However, in some cases, the scheduling module 210 may still encounter deadlocks in which case no operations in the SCC can progress. This may occur because (i) the scheduling algorithm may be unable to find a feasible solution among the various orderings and may become stuck, or (2) a feasible solution may not exist even if the target state is a valid state.

In various implementations, the scheduling module 210 may resolve deadlocks by reducing flow rates (e.g., by introducing rate limiters). Reducing flow rates frees up link resources on a path which allows removal of a tunnel. In turn, switching device memory resources may be freed and this allows some of the operations that were previously deadlocked, e.g., due to unavailable resources, to be completed. As a result of rate limiters, the scheduling algorithm 210 may implement an update operation partially, e.g., using a fraction of a total amount of resources required to implement the update operation wholly.

Example Algorithm 5 shows a procedure to resolve deadlocks for tunnel-based networks. The parameter k* determines a maximum number of flows that the scheduling module 210 rate limits each time and the scheduling module 210 controls the tradeoff between a time to resolve the deadlock and an amount of throughput loss.

| Algorithm 5 - Rate Limits (SCC, k*) |
| --- |
| 1:     $O^* \leftarrow$ weight change nodes $\in$ SCC |
| 2:     for i=0; i<k* && $O^* \neq \emptyset$; i++ do |
| 3:         $O_i \leftarrow O^*$.pop( ) |
| 4:         for path node $P_j \in$ children($O_i$) do |
|             // $f_i$ is the corresponding flow of $O_i$ |
| 5:             Rate limit flow $f_i$ by $l_{ij}$ on path $P_j$ |
| 6:             for resource node $R_k \in$ children($P_j$) do |
| 7:                 $R_k$.free $\leftarrow R_k$.free + $l_{ij}$ |
| 8:             Delete $P_j$ and its edges |

The scheduling module 210 iterates over up to k* weight change nodes in the SCC, each of which corresponds to a flow (Lines 2-8 in example Algorithm 5). The order of iteration may be based on the centrality approach discussed above. For each weight change node $O_i$, the scheduling module 210 iterates over children path nodes $P_j$. The scheduling module 210 reduces a rate on $P_j$ by $l_{ij}$ (Line 5 in example Algorithm 5) and accordingly increases the free resources of links on the path (Lines 6-7 in example Algorithm 5). The scheduling module 210 then deletes $P_j$ from the graph (line 8 in example Algorithm 5).

FIG. 10 illustrates an example process 1000 that schedules operation updates of a circular dependency in an update dependency graph. The example operations in FIG. 10 may be described with reference to the modules, components and/or elements illustrated in any one of FIGS. 1-9.

At 1002, the scheduling module 210 may determine that a circular dependency (e.g., a SCC) occurs between two or more operation nodes in an update dependency graph. The update dependency graph may also include resource nodes and/or path nodes.

At 1004, the scheduling module 210 represents the circular dependency as a single logical node (e.g., node 910). By representing the circular dependency as a single logical node then the update dependency graph may become a DAG.

At 1006, when the single logical node is scheduled to be implemented, the scheduling module 210 selects, as a circular dependency starting point, an operation node (e.g., node 902 or node 908) from the operation nodes in the circular dependency. In accordance with the centrality approach discussed above, the scheduling module 210 may be configured to identify and select an intersecting node as the circular dependency starting point.

At 1008, the scheduling module 210 uses the circular dependency starting point to implement update operations associated with the other operation nodes in the circular dependency or in multiple circular dependencies that overlap via the intersecting node.

CONCLUSION

Although the present disclosure may use language that is specific to structural features and/or methodological acts, the invention is not limited to the specific features or acts described herein. Rather, the specific features and acts are disclosed as illustrative forms of implementing the invention.

What is claimed is:
1. A method comprising:
determining a set of update operations to transition a state of a network from an observed network state to a target network state;
determining one or more constraints defined to ensure reliability of the network during the transition of the state of the network from the observed network state to the target network state;
generating, by one or more processors and based at least in part on the one or more constraints, an update dependency graph that includes at least a first ordering in which a first subset of the set of update operations can be scheduled and a second ordering in which a second subset of the set of update operations can be scheduled, wherein:
at least one update operation is included in both the first subset of update operations and the second subset of update operations; and
the update dependency graph indicates an amount of resources required to complete an individual update operation;
scheduling the first ordering;
receiving an indication of a failed update operation or a delayed update operation in the first ordering; and
dynamically scheduling, based at least in part on the indication, the second ordering such that the at least one update operation included in both the first subset of update operations and the second subset of update operations is scheduled to be completed via the second ordering.

2. The method of claim 1, wherein the failed update operation or the delayed update operation prevents successful completion of the at least one update operation via the first ordering.

3. The method of claim 1, wherein an individual update operation changes a traffic routing state variable at a switching device in the network to control a traffic flow.

4. The method of claim 1, wherein the update dependency graph includes one or more nodes indicating available capacity for a device or a link associated with an individual update operation.

5. The method of claim 1, wherein the update dependency graph indicates an amount of resources released after an individual update operation is completed.

6. The method of claim 1, wherein at least one of the one or more constraints is defined to:
avoid dropping data packets at a switching device that is part of a communication path in the network;
avoid routing data packets at a switching device that is part of a communication path in the network in accordance with an old rule associated with the observed network state and a new rule associated with the target network state;
avoid looping data packets within the network;
avoid congestion of one or more individual links between two devices in the network; or
avoid a memory overload of a device in the network.

7. One or more devices comprising:
one or more processors; and
memory storing computer executable instructions that, when executed by the one or more processors, cause the one or more devices to:
determine a set of update operations to transition a state of a network from an observed network state to a target network state;
receive feedback associated with at least one previously scheduled update operation of the set of update operations;
access, based at least in part on the feedback, an update dependency graph to dynamically select one or more next update operations during run-time implementation of the transition of the state of the network from the observed network state to the target network state, wherein the update dependency graph is generated based at least in part on one or more constraints defined to:
avoid dropping data packets at a switching device that is part of a communication path in the network;
avoid looping data packets within the network;
avoid congestion of one or more individual links between two devices in the network; or
avoid a memory overload of a device in the network; and
schedule the one or more next update operations of the set of update operations.

8. The one or more devices of claim 7, wherein the feedback comprises an indication that the at least one previously scheduled update operation is delayed or has failed.

9. The one or more devices of claim 7, wherein the update dependency graph comprises a strongly connected component representing at least two circular dependencies and the computer executable instructions further cause the one or more devices to identify an intersecting node of the strongly connected component to begin scheduling of update operations that belong to the strongly connected component.

10. The one or more devices of claim 7, wherein the update dependency graph comprises a strongly connected component representing one or more circular dependencies and the computer executable instructions further cause the one or more devices to partially limit resource consumption to implement one or more update operations of the strongly connected component.

11. A system comprising:
one or more processors; and
memory storing computer executable instructions that, when executed by the one or more processors, cause the system to:
determine update operations to transition a state of a network from an observed network state to a target network state;
generate dependencies between the update operations based at least in part on one or more constraints defined to ensure reliability of the network during the transition of the state of the network from the observed network state to the target network state, wherein the dependencies define a first update operation to be completed after successful completion of either a second update operation or a third update operation;
schedule the second update operation for completion;
determine that the second update operation has not been completed;
based on a determination that the second update operation has not been completed, schedule the third update operation for completion; and
based on a determination that the third update operation has been completed, schedule the first update operation for completion.

12. The system of claim 11, wherein:
the dependencies are modeled in an update dependency graph;
the second update operation is part of a first ordering of dependent update operations in the update dependency graph that does not include the third update operation;
the third update operation is part of a second ordering of dependent update operations in the update dependency graph that does not include the second update operation; and
the first update operation is part of both the first ordering and the second ordering.

13. The system of claim 11, wherein an individual update operation changes a traffic routing state variable at a switching device in the network to control a traffic flow.

14. The system of claim 11, wherein at least one of the one or more constraints is defined to:
avoid dropping data packets at a switching device that is part of a communication path in the network;
avoid routing data packets at a switching device that is part of a communication path in the network in accordance with an old rule associated with the observed network state and a new rule associated with the target network state;
avoid looping data packets within the network;
avoid congestion of one or more individual links between two devices in the network; or
avoid a memory overload of a device in the network.

15. The system of claim 11, wherein the network comprises a data-center network (DCN).

16. The system of claim 11, wherein each of the first update operation, the second update operation, and the third update operation is associated with a different device or link in the network.

17. The system of claim 11, wherein the determining that the second update operation has not been completed is based on received feedback indicating that the second update operation is delayed or has failed.

* * * * *